United States Patent
Hirate et al.

(10) Patent No.: US 10,843,726 B2
(45) Date of Patent: Nov. 24, 2020

(54) METHOD AND APPARATUS FOR ASSISTING STEERING OF VEHICLE

(71) Applicant: DENSO CORPORATION, Kariya (JP)

(72) Inventors: Yosuke Hirate, Kariya (JP); Daiji Watanabe, Kariya (JP); Hisaya Akatsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 137 days.

(21) Appl. No.: 16/007,190

(22) Filed: Jun. 13, 2018

(65) Prior Publication Data

US 2018/0362073 A1 Dec. 20, 2018

(30) Foreign Application Priority Data

Jun. 14, 2017 (JP) .................................. 2017-116784

(51) Int. Cl.
| | |
|---|---|
| *B62D 6/00* | (2006.01) |
| *B62D 5/04* | (2006.01) |
| *B62D 5/00* | (2006.01) |
| *B62D 15/02* | (2006.01) |

(52) U.S. Cl.
CPC ............. *B62D 6/002* (2013.01); *B62D 5/008* (2013.01); *B62D 5/0463* (2013.01); *B62D 15/0285* (2013.01)

(58) Field of Classification Search
CPC combination set(s) only.
See application file for complete search history.

(56) References Cited

U.S. PATENT DOCUMENTS

| | | | |
|---|---|---|---|
| 2008/0154464 A1 | 6/2008 | Sasajima et al. | |
| 2013/0090807 A1 | 4/2013 | Kojima et al. | |
| 2013/0325264 A1* | 12/2013 | Alcazar | B62D 1/181 |
| | | | 701/49 |
| 2017/0021862 A1 | 1/2017 | Akatsuka et al. | |
| 2017/0248952 A1* | 8/2017 | Perkins | B60W 50/082 |
| 2018/0281845 A1* | 10/2018 | Wijffels | B62D 1/181 |

FOREIGN PATENT DOCUMENTS

| | | |
|---|---|---|
| JP | 2002-012159 A | 1/2002 |
| JP | 2012-001063 | 1/2012 |
| JP | 2015-168369 A | 9/2015 |

* cited by examiner

*Primary Examiner* — Abby Y Lin
*Assistant Examiner* — Renee LaRose
(74) *Attorney, Agent, or Firm* — Maschoff Brennan

(57) ABSTRACT

In a vehicle, an amount of change of a turning angle of a turning mechanism to an amount of change of a steering angle of a steering input device is defined as a transfer ratio, the turning mechanism is rotationally driven by a turning drive unit, and a driver's body posture parameter is detected by a body posture parameter detector. An apparatus for steering the vehicle includes a controller that executes an automatic steering mode that determines a target value for the turning angle of the turning mechanism based on a travelling condition of the vehicle and/or information about a road on which the vehicle is travelling, and controls the turning mechanism to adjust the turning angle of the turning mechanism to the target value. A transfer ratio adjuster adjusts the transfer ratio in accordance with the body posture parameter during execution of the automatic steering mode.

14 Claims, 5 Drawing Sheets

METHOD AND APPARATUS FOR ASSISTING STEERING OF VEHICLE

CROSS REFERENCE TO RELATED APPLICATIONS

This application is based on and claims the benefit of priority from Japanese Patent Application 2017-116784 filed on Jun. 14, 2017, the disclosure of which is incorporated in its entirety herein by reference.

TECHNICAL FIELD

The present disclosure relates to methods and apparatuses for assisting steering of a vehicle.

BACKGROUND

There is known a steering assist apparatus that operates in an automatic steering mode to thereby determine, based on travelling information and/or travelling-course information about a vehicle, a turning angle of at least one steerable road wheel of the vehicle without the need of any input from a steering wheel thereto; the steering wheel serves as a steering input device for inputting driver's steering information to the steering assist apparatus. The travelling information about the vehicle, which includes, for example, the travelling speed of the vehicle, and the travelling-course information, which includes, for example, how the travelling course of the vehicle is shaped, can be measured by sensors installed in the vehicle, such as a radar sensor, a camera sensor, and a vehicle speed sensor.

The above steering assist technology using such a steering assist apparatus that operates in the automatic steering mode can be applied to, for example, parking assistance systems for assisting driver's parking operations of a vehicle and/or collision avoidance assistance systems for avoiding a collision of a vehicle with other objects. For example, Japanese Patent Application Publication No. 2008-179345 discloses a parking assistance system in which such a steering assist technology has been applied, and Japanese Patent Application Publication No. 2012-1063 discloses a collision avoidance system in which such a steering assist technology has also been applied.

SUMMARY

Turning of the steerable road wheel of the vehicle while the steering assist apparatus is operating in the automatic steering mode causes the steering wheel to turn. The turning amount of the steering wheel is determined based on the turning amount of the steerable road wheel and a transfer ratio; the transfer ratio represents the ratio of the amount of change of a turning angle of the steerable road wheel to the amount of change of a steering angle of the steering wheel.

The turning movement of the steering wheel is independent of the driver. Depending on the posture of the driver, the turning movement of the steering wheel may interfere with or be in contact with the driver. Even if the driver takes a suitable posture so as not to interfere with the unintentional turning movement of the steering wheel, a deviation between the turning of the vehicle and the turning movement of the steering wheel may cause the driver to have a feeling of strangeness or a feeling of anxiety.

It has been therefore desired to prevent the steering input device from interfering or being in contact with the driver in the automatic steering mode, and to prevent or reduce the driver from having a feeling of strangeness and a feeling of anxiety in the automatic steering mode.

The present disclosure aims to satisfy the desire set forth above, and can be designed as, for example, first to third exemplary aspects described hereinafter.

According to the first exemplary aspect of the present disclosure, there is provided an apparatus for controlling steering of a vehicle in which an amount of change of a turning angle of a turning mechanism to an amount of change of a steering angle of a steering input device is defined as a transfer ratio. The apparatus includes a turning drive unit configured to rotationally drive the turning mechanism, and a body posture parameter detector configured to detect a body posture parameter indicative of a body posture of a driver of the vehicle. The apparatus includes a controller configured to execute an automatic steering mode to 1. Determine a target value for the turning angle of the turning mechanism in accordance with at least one of a travelling condition of the vehicle and information about a road on which the vehicle is travelling 2. Control the turning drive unit to adjust the turning angle of the turning mechanism to the target value The apparatus includes a transfer ratio adjuster configured to adjust the transfer ratio in accordance with the body posture parameter during execution of the automatic steering mode.

According to the second exemplary aspect of the present disclosure, there is provided an apparatus for controlling a steering input device of a vehicle in which a ratio of an amount of change of a turning angle of a turning mechanism to an amount of change of a steering angle of the steering input device is defined as a transfer ratio, the turning mechanism is rotationally driven by a turning drive unit, and a body posture parameter indicative of a body posture of a driver is detected by a body posture parameter detector. The apparatus includes a controller configured to execute an automatic steering mode to:

1. Determine a target value for the turning angle of the turning mechanism in accordance with at least one of a travelling condition of the vehicle and information about a road on which the vehicle is travelling 2. Control the turning drive unit to adjust the turning angle of the turning mechanism to the target value The apparatus includes a transfer ratio adjuster configured to adjust the transfer ratio in accordance with the body posture parameter during execution of the automatic steering mode.

According to the third exemplary aspect of the present disclosure, there is provided a method of controlling a steering of a vehicle. In the vehicle, a ratio of an amount of change of a turning angle of a turning mechanism to an amount of change of a steering angle of a steering input device is defined as a transfer ratio, the turning mechanism is rotationally driven by a turning drive unit, and a body posture parameter indicative of a body posture of a driver is detected by a body posture parameter detector. The method includes executing an automatic steering mode to:

1. Determine a target value for the turning angle of the turning mechanism in accordance with at least one of a travelling condition of the vehicle and information about a road on which the vehicle is travelling 2. Control the turning drive unit to adjust the turning angle of the turning mechanism to the target value The method includes adjusting the transfer ratio in accordance with the body posture parameter during execution of the automatic steering mode.

Each of the first to third exemplary aspects of the present disclosure is configured to adjust the transfer ratio in accordance with the body posture parameter during execution of the automatic steering mode, making it possible to adjust the transfer ratio to a value suitable for the driver's body posture. This enables a part of the driver to be prevented from contacting or interfering with the steering input device.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
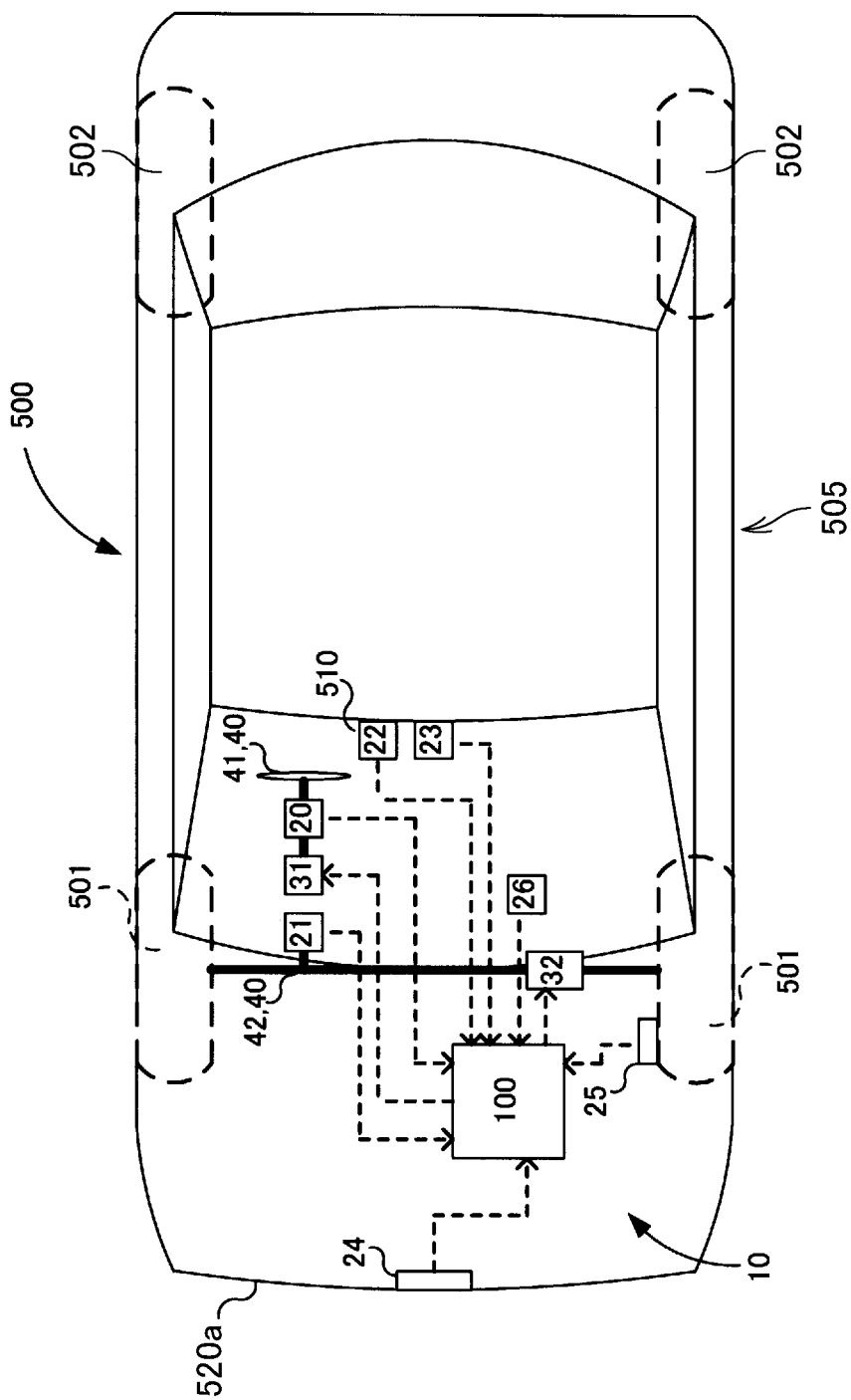
FIG. 1 is a block diagram schematically illustrating a steering assist system installed in a vehicle according to the first embodiment of the present disclosure.

The following describes cruise assist systems and methods for a vehicle according to preferred embodiments of the present disclosure with reference to the accompanying drawings. Note that the cruise assist methods for a vehicle can be implemented as cruise-assist control programs for a vehicle; the programs cause a computer to execute instructions, i.e. processing steps. The cruise assist methods for a vehicle can also be implemented as computer-readable storage media each storing one of the cruise-assist control programs. In the embodiments, like parts between the embodiments, to which like reference characters are assigned, are omitted or simplified to avoid redundant description.

First Embodiment

The following describes the first embodiment of the present disclosure with reference to FIGS. 1 to 10.

Referring to FIG. 1, a steering assist system 10 according to the first embodiment serves as, for example, an apparatus for controlling steering of a vehicle 500. The steering assist system 10 is installed in the vehicle 500. The steering assist system 10 includes a steering sensor 20, a rotational angle sensor 21, a front camera 22, a vehicle interior camera 23, a millimeter-wave radar 24, a wheel speed sensor 25, a global positioning system (GPS) sensor 26, a steering drive unit 31, a turning drive unit 32, an informing device 50 (see FIG. 3), and a control apparatus 100.

The vehicle 500 includes front wheels 501, rear wheels 502, a vehicular body 505, a front windshield 510, a front bumper 520, and a steering mechanism 40. The front windshield 510 is mounted to a portion of the vehicle body 505 in front of front occupants. The front bumper 520 is attached to the front end of the vehicle body 505.

Note that the vehicle 500 can be comprised of at least the millimeter-wave radar 24 as at least one sensor for detecting a target object in front of the vehicle 500. The vehicle 500 can include the millimeter-wave radar 24 and at least one of a laser radar (LIDAR) and the front camera 22. The vehicle 500 can also include a stereo camera as at least one sensor in place of the millimeter-wave radar 24, and can be comprised of a stereo camera in addition to the millimeter-wave radar 24.

Figure 2:
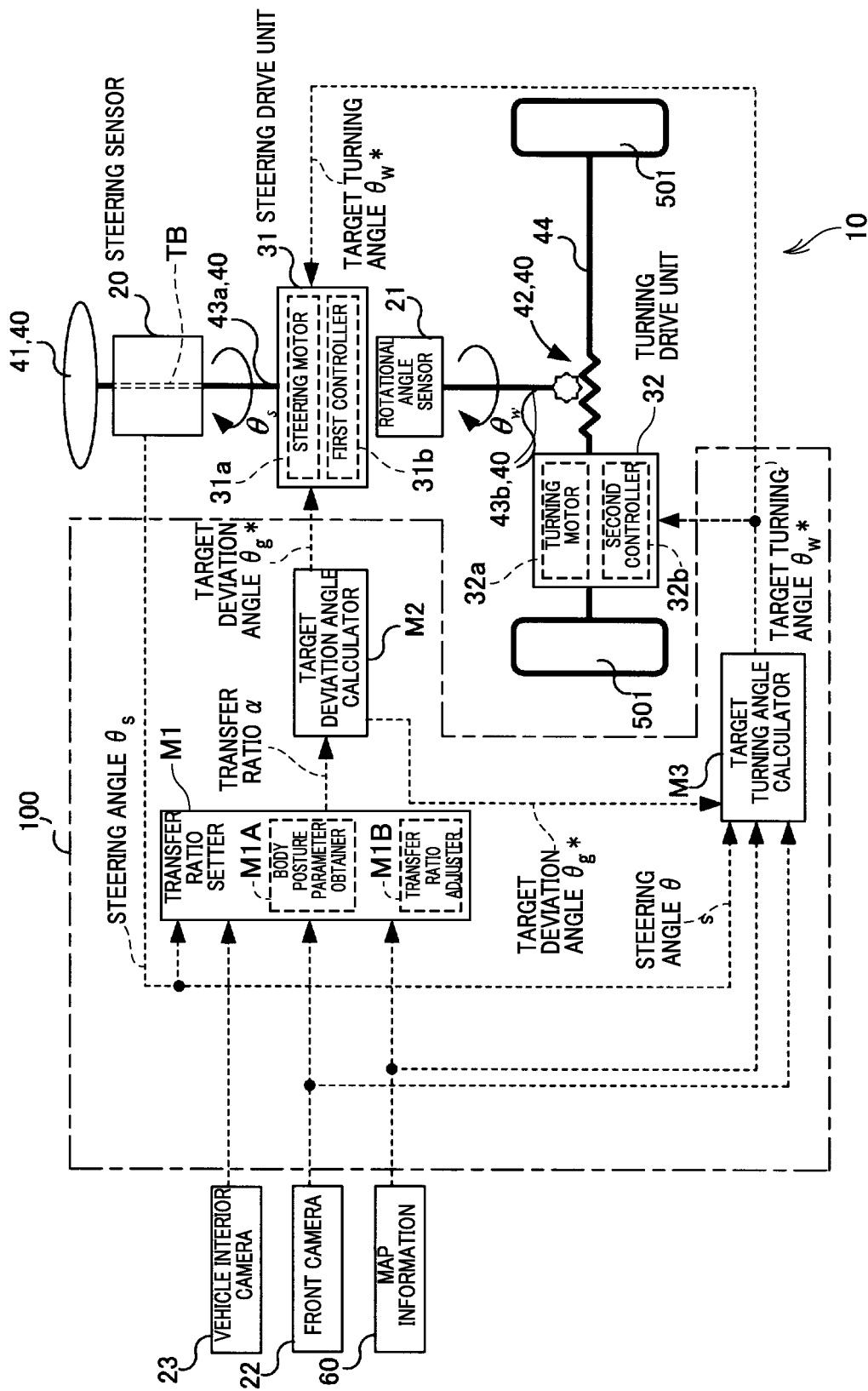
FIG. 2 is a block and structural diagram schematically illustrating a hardware structure of a steering mechanism and illustrating functional modules implementable by the steering assist system illustrated in FIG. 1.

Referring to FIG. 2, the steering mechanism 40 is designed as, for example, a steer-by-wire configuration, and is comprised of, for example, a steering wheel 41, a turning mechanism 42, an upper steering shaft 43a, a lower steering shaft 43b, and turning axles 44.

The steering wheel 41 serves as an occupant's operable input device that inputs, to the steering drive unit 31, information for changing the travelling direction of the vehicle 500 upon being operated, i.e. turned, by an occupant, such as a driver, of the vehicle 500.

Figure 5:
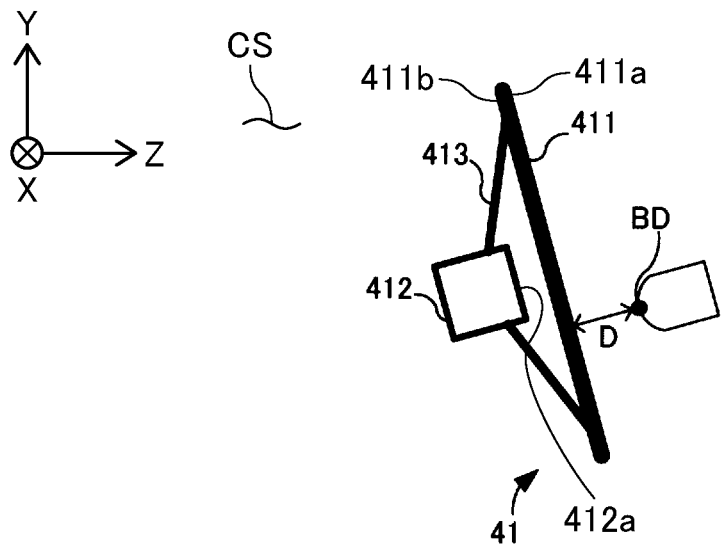
FIG. 5 is a view schematically illustrating a physical position relationship between a tip of a hand of a driver, which is an example of a part of the driver, and a steering wheel detected by the steering assist system according to the first embodiment.

For example, as illustrated in FIG. 5, the steering wheel 41 is comprised of a ring rim 411 having opposing first and second surfaces 411a and 411b and located such that the first surface 411a faces a driver of the vehicle 500. The steering wheel 41 is also comprised of a substantially cylindrical hub 412 coaxially located with the center of the ring rim 411 and separated from the center of the ring rim 411 such that the hub 412 is closer to the second surface of the ring rim 411 than to the first surface thereof. The ring rim 411 is further comprised of spokes 413 that connect the ring rim 411 and the hub 412. The hub 412 has a surface 412a facing a driver of the vehicle 500.

The upper steering shaft 43a has opposing first and second ends, and the steering wheel 41 is mounted to the first end of the upper steering shaft 43a. The second end of the upper steering shaft 43a is rotatably connected to the steering drive unit 31 such that the steering drive unit 31 applies reaction force to the upper steering shaft 43a. The steering sensor 20 is mounted to an axially middle portion of the upper steering shaft 43a. The steering sensor 20 is configured to measure a steering angle θs of the steering wheel 41, i.e. a steering position of the steering wheel 41, as a rotational angle of the upper steering shaft 43a. The steering sensor 20 is also configured to measure steering torque applied to the upper steering shaft 43a based on occupant's turning operation of the steering wheel 41.

As another example, a steering stick can be provided as an occupant's operable input device that inputs, to the steering drive unit 31, information for changing the travelling direction of the vehicle 500 upon being operated, i.e. linearly moved or inclined, by an occupant, such as a driver, of the vehicle 500. Specifically, the steering stick can be configured to be movable along a ling including a neutral position at the center of the line. A position of the steering stick, which is operated by an occupant, relative to the neutral position can be input to the steering drive unit 31 as the steering angle θs of the steering wheel 41. That is, an amount of change of the steering stick relative to the neutral position corresponds to an amount of change of the steering angle $\theta s$ of the steering wheel 41 relative to a reference angle or a reference position of the steering wheel 41 described later.

The lower steering shaft 43b has opposing first and second ends, and, because the steering mechanism 40 is designed as the steer-by-wire configuration, the lower steering shaft 43b is not mechanically coupled to the upper steering shaft 43a. Specifically, the rotational angle sensor 21 is mounted to the first end of the lower steering shaft 43b or an axially middle portion of the lower steering shaft 43b. The second end of the lower steering shaft 43b is coupled to the turning mechanism 42.

The turning mechanism 42 is designed a rack-and-pinion mechanism including a rod-shaped rack and a pinion. The pinion is mounted to the second end of the lower steering shaft 43b, and is engaged with the rack. The rack is located in the horizontal direction, i.e. the width direction, of the vehicle 500, and has both ends. Each of the turning axles 44 has opposing first and second ends. The first end of each of the turning axles 44 is coupled to a corresponding one of both ends of the rack. One of front wheels 501 is mounted to the second end of one of the turning axles 44, and the other of the front wheels 501 is also mounted to the second end of the other of the turning axles 44.

The turning mechanism 42, which is comprised of a turning motor, is coupled to, for example, one of the turning axles 44.

The steering drive unit 31 includes a steering motor 31a and a first motor controller 31b. The steering motor 31a includes an output shaft whose output end is coupled directly to the second end of the upper steering shaft 43a, or coupled to the second end of the upper steering shaft 43a via an unillustrated gear reducer if need arises. For example, a brushless direct-current (DC) motor can be used as the steering motor. The first motor controller 31b is controllably connected to the steering motor 31a. The steering motor 31a is configured to generate reaction torque that serves as friction resistance between the tires of the front wheels 501 and the road surface on which the vehicle 500 is travelling. Specifically, while being controlled by the first motor controller 31b, the steering motor 31a generates reaction torque that depends on the speed of the vehicle 500, and provides the reaction torque to a driver of the vehicle 500 via the steering wheel 41. The steering motor 31a is also configured to set the steering position of the steering shaft 41 such that the steering position of the steering shaft 41 matches with the turning angle of the vehicle 500 in an automatic steering mode of the control apparatus 100 described later.

The turning drive unit 32 includes a turning motor 32a and a second motor controller 32b. The turning motor 32a includes an output shaft whose output end is coupled directly to a pinion, or a pinion and a gear reducer coupled to the pinion. The pinion or gear reducer of the turning motor is engaged with the rack of the turning mechanism 42. Torque generated by the turning motor 32a enables the rack to move in the horizontal direction, i.e. the vehicle width direction. This horizontal movement of the rack of the turning mechanism 42 results in horizontal movement of the turning axles 44, so that the front wheels 501 are turned. That is, controlling the rotational angle of the turning motor 32a of the turning drive unit 32 enables the front wheels 501 to be controllably turned.

The turning drive unit 32 serves as, for example, a turning mechanism driver, and drives the turning mechanism 42 independently of driver's steering force input from the steering wheel 41, thus setting a desired turning angle of each of the front wheels 501. Note that the turning motor 32a of the turning drive unit 32 can be coaxially mounted to one of the steering axles 44, or coaxially mounted to the lower steering shaft 43b, or integrally mounted to the turning drive unit 32.

As described above, the turning mechanism 42 is comprised of the pinion engaged coupled to the second end of the lower steering shaft 43b, and the rack engaged with the pinion; both ends of the rack are respectively coupled to the turning axles 44. As described above, the turning mechanism 42 enables rotational movement of the lower steering shaft 43b to be converted into movement of the turning axles 44 in their axial directions, i.e. linear movement of the turning axles 44 in the vehicle width direction. This linear movement of the turning axles 44 enables the front wheels 501 to be set to a desired turning angle $\theta w$ of each of the front wheels 501.

For the steer-by-wire steering mechanism 40, the steering drive unit 31 and the turning drive unit 32 carry out a turning-angle and steering-angle variable function. Specifically, the steering drive unit 31 and the turning drive unit 32 variably control the steering angle $\theta s$ and the turning angle $\theta w$ in accordance with a target deviation angle $\theta g^*$.

In a manual steering mode of the control apparatus 100 described later, a driver's turning operation of the steering wheel 41 inputs steering torque to the steering drive unit 31. Then, the steering drive unit 31 applies reaction torque to the driver of the vehicle 500 via the steering wheel 41 in accordance with a value of the steering angle $\theta s$ or the steering torque measured by the steering sensor 20.

In addition, in the manual steering mode, the control apparatus 100 determines a value of the target deviation angle $\theta g^*$ to thereby determine a value of the target turning angle $\theta w^*$ in accordance with the determined value of the deviation angle $\theta g^*$ and the value of the steering angle $\theta s$ measured by the steering sensor 20. This enables the second motor controller 32b of the turning drive unit 32 to control the turning motor 32a based on the determined value of the target turning angle $\theta w^*$. That is, the turning drive unit 32 drives its turning motor 32a in accordance with the value of the target turning angle $\theta w^*$ that is calculated based on the target deviation angle $\theta g^*$ and the value of the steering angle $\theta s$ An automatic steering switch SW, which is designed as an occupant-operable on-off switch, is provided in the interior of the vehicle 500, and is communicably connected to the CPU 101 via the I/O interface 103. That is, occupant's turning on the automatic steering switch SW causes the CPU 101 to continuously execute the automatic steering mode until the automatic steering switch SW is turned off.

In the automatic steering mode of the control apparatus 100, the control apparatus 100 determines a value of the target turning angle $\theta w^*$. Then, the turning drive unit 32 drives its turning motor 32a in accordance with the determined value of the target turning angle $\theta w^*$ to thereby automatically drive the turning mechanism 42 so that each of the front wheels 501 is turned to the target turning angle $\theta w^*$.

In the automatic steering mode, the steering drive unit 31 determines a value of the target steering angle $\theta s^*$ based on a value of the turning angle $\theta w$ measured by the rotational angle sensor 21, and a value of the target deviation angle $\theta g^*$ determined by the control apparatus 100 in accordance with the following equation "$\theta s^* = \theta w - \theta g^*$". That is, when the turning mechanism 42 is driven to cause each of the front wheels 501 to be turned to the target turning angle $\theta w^*$, the steering mechanism 31 causes the steering wheel 31 to be automatically tuned to a value of the target steering angle θs*. Because the steering angle θs is adjusted to the target steering angle θs*, the following equation "θs=θw−θg*" is established. Similarly, because the turning angle θw is adjusted to the target turning angle θw*, the following equation "θs* or θs=θw*−θg*" is established.

That is, the relationships among the steering angle θs, the turning angle θw, and the deviation angle θg can be established even if at least one of the steering angle θs, the turning angle θw, and the deviation angle θg is changed to a corresponding target value θs*, θw* or θg*.

Specifically, in the steer-by-wire steering mechanism 40, each of the steering drive unit 31 and the turning drive unit 32 is comprised of the corresponding one of the steering motor 31a and the turning motor 32a, and is configured to individually control the corresponding one of the steering motor 31a and the turning motor 32a.

For this reason, the relative angle between the upper steering shaft 43a and the lower steering shaft 43b becomes variable, resulting in an actual deviation angle θg between the steering angle θs of the steering wheel 41 and the turning angle θw becoming continuously variable.

Figure 3:
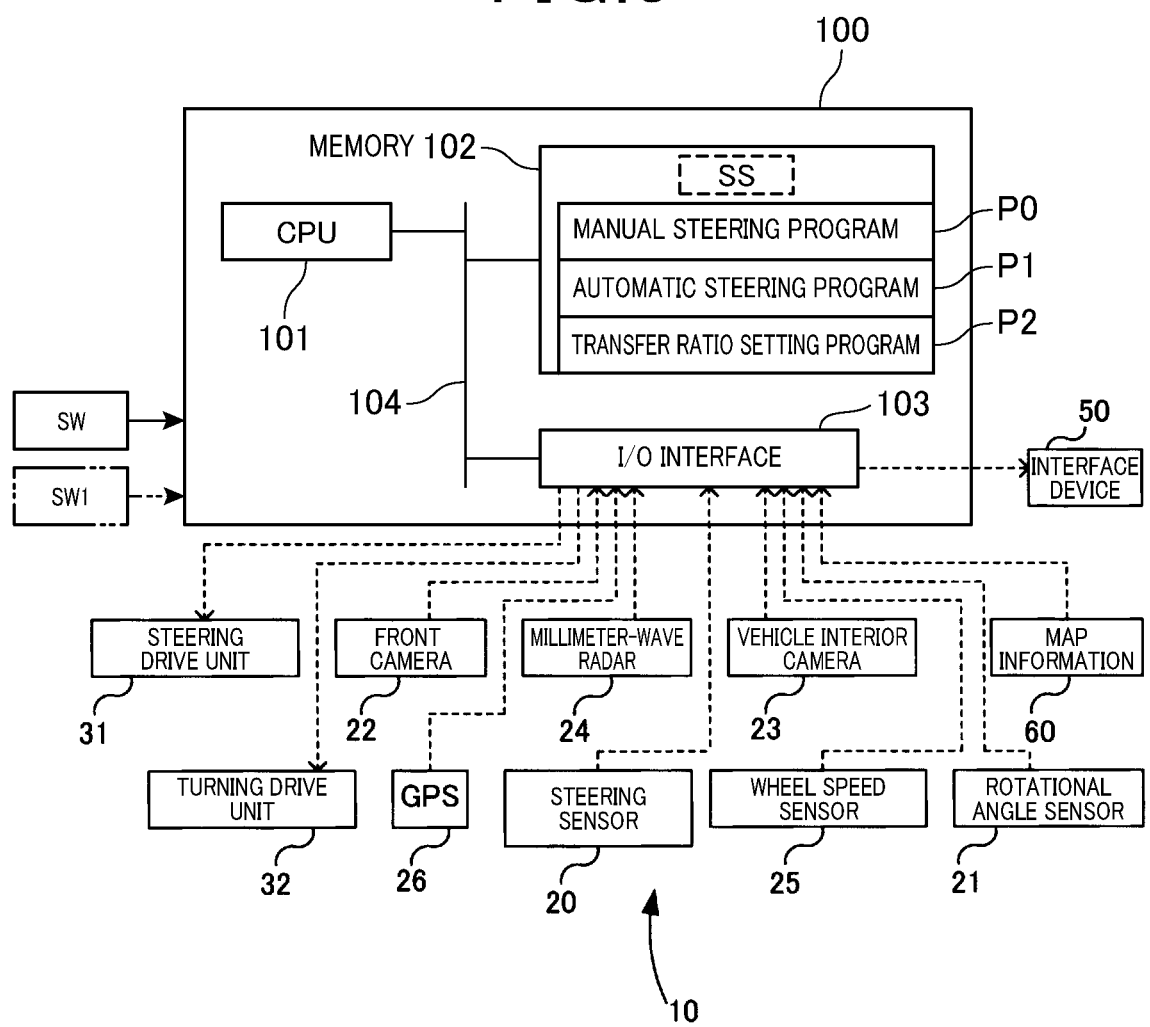
FIG. 3 is a system configuration diagram schematically illustrating a system configuration of the steering assist system illustrated in FIG. 1.

Referring to FIG. 3, the control apparatus 100 is comprised of at least one microcomputer circuit including a CPU 101, a memory unit 102, an input-output (I/O) interface 103, and a bus 104 that are mutually connected to each other such that they are communicable with each other.

The memory unit 102 for example includes a first memory, such as a ROM, in which various programs including at least a manual steering program P0, an automatic steering control program P1, and a transfer ratio setting program P2 are stored. The memory unit 102 also includes, for example, a second memory, such as a RAM, from which the CPU 101 can read data and into which the CPU 101 can write data. The memory unit 102 also includes a third memory in which navigation map data indicative of diagrammatic representation of the areas through which the vehicle 500 can travel is stored.

The manual steering program P0 is designed to instruct the CPU 101 to (1) Control the turning drive unit 32 to horizontally move the rack based on the value of the steering angle θs measured by the steering sensor 20 to horizontally move the turning axles 44, thus turning each of the front wheels 501

(2) Control the steering drive unit 31 to thereby apply suitable reaction torque to a drier of the vehicle in the manual steering mode The automatic steering control program P1 is designed to instruct the CPU 101 to (1) Determine a target turning angle θw* based on at least one of the travelling conditions of the vehicle 500 and information about the road on which the own vehicle 500 is travelling; the target turning angle θw* represents a target value to which the turning angle θw should be adjusted by the turning mechanism 42

(2) Control the turning drive unit 32 based on the determined target steering angle θw* in the automatic steering mode In addition, the transfer ratio setting program P2 is designed to instruct the CPU 101 to set a transfer ratio α in accordance with the driver's body posture; the transfer ratio α represents the ratio of the amount of change of the turning angle θw to the amount of change of the steering angle θs.

Specifically, the transfer ratio setting program P2 is designed to instruct the CPU 101 to set the transfer ratio α to increase the transfer ratio α with a decrease of a minimum distance between a predetermined part of the driver's body and the steering wheel 41. Because the steering wheel 41 cannot be moved to be close to the driver, change of the minimum distance between the predetermined part of the driver's body and the steering wheel 41 depends on change of the predetermined part of the driver's body. Note that the transfer ratio setting program P2 can be designed to instruct the CPU 101 to set the transfer ratio α continuously or discretely.

The CPU 101 executes the normal steering program P0 to serve as a first steering controller to control the steering drive unit 31 and the turning drive unit 32 to turn each of the front wheels 501 and provide reaction torque to the driver.

The CPU 101 also executes the automatic steering control program P1 to serve as a second steering controller to perform the automatic steering mode.

The CPU 101 further executes the transfer ratio setting program P2 to serve as a transfer ratio setter in accordance with the driver's body posture in the automatic steering mode. Note that the turning drive unit 32 in addition to the CPU 101 can serve as the second steering controller for executing the automatic steering mode. The turning drive unit 32 mainly serves as a turning-mechanism actuator that drives the turning mechanism 42 to thereby turn each of the front wheels 501 to a target turning angle θw*. The CPU 101 can be designed as a single processor or a plurality of processors each executing a corresponding at least one program stored in the memory unit 102. The CPU 101 can also be designed as a multithreaded CPU that simultaneously executes plural programs stored in the memory unit 102 for example.

The steering sensor 20, rotational angle sensor 21, front camera 22, vehicle interior camera 23, millimeter-wave radar 24, wheel speed sensor 25, GPS sensor 26, steering drive unit 31, turning drive unit 32, and informing device 50 are communicably connected to the I/O interface 103 via respective control lines. As described later, measurement signals respectively sent from the rotational angle sensor 21, front camera 22, vehicle interior camera 23, millimeter-wave radar 24, wheel speed sensor 25, and GPS sensor 26 are input to the I/O interface 103. Instruction signals for instructing a target steering angle θs* and the target turning angle θw* are output from the I/O interface 103 to the respective steering drive unit 31 and turning drive unit 32. An instruction signal for instructing output of visible and/or audible warning information is also output from the I/O interface 103 to the informing device 50.

The steering sensor 20 is configured to measure a rotational angle of the steering wheel 41, i.e. a steering position of the steering wheel 41, as the steering angle θs of the upper steering shaft 43a.

For example, the steering sensor 20 measures the steering angle θs of the upper steering shaft 43a being zero degrees (0°) while the vehicle 500 is travelling straight ahead. The steering angle θs of the steering wheel 41 being zero degrees will be referred to as a reference angle or reference position of the steering wheel 41 hereinafter.

In addition, the steering sensor 20 outputs, as a measurement signal, a positive value of the steering angle θs of the steering wheel 41, i.e. a positive value of the rotational angle θs of the upper steering shaft 43a, when the steering wheel 41 has turned rightward relative to the reference position of the steering wheel 41. Moreover, the steering sensor 20 outputs, as the measurement signal, a negative value of the steering angle θs of the steering wheel 41, i.e. a negative value of the rotational angle θs of the upper steering shaft 43a, when the steering wheel 41 has turned leftward relative to the reference position of the steering wheel 41.

As another example, the steering sensor 20 outputs, as the measurement signal, a positive absolute value of the steering angle θs of the steering wheel 41, i.e. a positive absolute value of the rotational angle θs of the upper steering shaft 43a, within 360 degrees and the number of rotations of the steering wheel 41.

The upper steering shaft 43a is comprised of unillustrated first and second shaft elements and a torsion bar TB connecting between the first and second shaft elements; the first shaft element is coupled to the steering wheel 41, and the second shaft element is coupled to the steering motor 31a. Driver's steering operation of the steering wheel 41 causes the first shaft element to turn, so that the torsion bar TB is also turned in synchronization with turning of the first shaft member. At that time, the second shaft member is turned while being delayed with the turning of the first shaft member, resulting in the torsion bar TB being twisted relative to the second shaft member.

The steering sensor 20 measures a twisted angle of the torsion bar TB as a phase difference between the torsion bar TB and the second shaft element, and converts the phase difference into steering torque. Then, the steering sensor 20 outputs a measurement signal indicative of the steering torque.

For example, the steering sensor 20 outputs a positive signal value of the steering torque when the steering wheel 41 has turned rightward relative to the reference position of the steering wheel 41, and outputs a negative signal value of the steering torque when the steering wheel 41 has turned leftward relative to the reference position of the steering wheel 41. As the steering sensor 20, a rotational angle sensor and a torque sensor can be provided as discrete components.

The rotational angle sensor 21 is configured to measure a rotational angle of the lower steering shaft 43b to thereby measure the turning angle θw of each of the front wheels 501. The rotational angle sensor 21 can be configured to measure the rotational angle of the turning motor 32a as the turning angle θw.

For example, the rotational angle sensor 21 measures the turning angle θw as being zero degrees (0°) while the vehicle 500 is travelling straight ahead. The turning angle θw being zero degrees will be referred to as a reference angle hereinafter.

In addition, the rotational angle sensor 21 outputs, as a measurement signal, a positive value of the turning angle θw when each of the front wheels 501 has turned rightward relative to the reference angle. Moreover, the rotational angle sensor 21 outputs, as the measurement signal, a negative value of the turning angle θw when each of the front wheels 501 has turned leftward relative to the reference angle.

As another example, the rotational angle sensor 21 outputs, as the measurement signal, a positive absolute value of the turning angle θw within 360 degrees and the number of rotations of the lower steering shaft 43b.

The front camera 22 is, for example, mounted to the center of the upper portion of the front windshield 501. The front camera 22 is designed as a monocular camera comprised of a single charge-coupled device (CCD) image sensor or a single complementary metal-oxide-semiconductor (CMOS) image sensor. The image sensor is comprised of light-sensitive elements; the light-sensitive elements serve as pixels and are arranged in a two-dimensional array. The two-dimensionally arranged pixels constitute a light receiving area, i.e. an imaging area, on which visible light incident to the front camera 22 is received.

That is, the front camera 22 successively captures an image, i.e. a frame image, of a predetermined front region ahead of the vehicle 500 based on visible light incident from the front region to the imaging area such that each of the light-sensitive elements (pixels) receives a corresponding component of the visible light.

The front camera 22 successively outputs, as measurement signals, successively captured frame images to the control apparatus 100; each of the frame images, which is also referred to as image data frames, is comprised of pixel values each corresponding to the component of the visible light received by a corresponding one of the pixels of the imaging area. Each of the frame images is a monochrome image or a color image.

As the front camera 22, a stereo camera comprised of plural image sensors for measuring distances of predetermined points of a target object can be used.

The vehicle interior camera 23 is mounted to, for example, a predetermined position in the interior of the vehicle body 505 where the vehicle interior camera 23 can capture images of at least the upper body of a driver of the vehicle 500. For example, the vehicle interior camera 23 is mounted to one of (1) A rearview mirror such that its optical axis faces the driver (2) An inner surface of the upper portion of the front windshield 501 such that its optical axis faces the driver (3) A dashboard panel of the vehicle 500 such that its optical axis faces the driver (4) A steering column of the steering wheel 41 such that its optical axis faces the driver The vehicle interior camera 23 is designed as a stereo camera, which is identical to the front camera 22.

That is, the stereo camera 23 captures a pair of right and left frame images using right and left cameras spaced from each other. Then, the stereo camera 23 is configured to calculate disparity information between each pair of two corresponding points between the right and left images based on the interval between the optical axes of the right and left cameras and the focal length of each of the right and left cameras. Performing triangulation based on the disparity information, the focal length, and the interval makes it possible to measure the distance between the stereo camera 23 and a three-dimensional point corresponding to the two corresponding points.

Alternatively, the vehicle interior camera 23 can be comprised of a monocular camera if a depth sensor can be installed in the vehicle 500. The depth sensor is configured to measure a depth, i.e. a distance, of a target object relative to the depth sensor.

In addition, an infrared camera for irradiating far-infrared light to a target object and receiving echoes based on reflection of the far-infrared light from the target object can be used as the vehicle interior camera 23.

The vehicle interior camera 23 is configured to successively capture images of at least the upper body of a driver of the vehicle 500, and detect, based on the captured images, information about the body posture of driver of the vehicle 500; the information about the body posture of driver, will be referred to as body posture information includes (1) The posture of the upper body of the driver (2) The positions of the arms of the driver (3) The position of the head of the driver (4) The angles of the head of the driver (5) The state of each eyelid (6) The direction or movement of driver's line of sight Note that the angles of the head of the driver include (1) An inclination angle between a line passing through the vertex of the head of the driver and a vertical direction (2) A right-left angle between a line passing through both ears of the driver and a width direction of the vehicle 500

That is, the body posture information about a driver according to the first embodiment includes at least one of the posture of the upper body of the driver, the positions of the arms of the driver, the position of the head of the driver, the angles of the head of the driver, the state of each eyelid, and the direction of driver's line of sight.

The millimeter-wave radar 24 is mounted to, for example, the center of the front bumper 520. The millimeter-wave radar 24 is configured to transmit millimeter waves to a predetermined region, such as a front region, ahead of the vehicle 500, and receive reflected waves, such as echoes, generated based on reflection of the transmitted radar waves from target objects located in the front region. That is, the millimeter-wave radar 24 aims to detect, based on the received reflected waves, the position of each target object, the horizontal and/or vertical azimuths of each target object relative to the vehicle 500, and the distance of each target object relative to the vehicle 500.

A plurality of millimeter-wave radars 24 can be mounted to the whole surface of the front bumper 520 or two millimeter-wave radars 24 can be respectively mounted to both lateral sides of the front bumper 520.

For example, the millimeter-wave radar 24 can include a signal processing circuit configured to perform predetermined signal processing based on the received echoes from a target object to thereby output a measurement signal indicative of the sequence of dots; each of the dots represents a typical position of the target object. At that time, the control circuit 100 can be configured to perform predetermined signal processing based on the measurement signal to thereby detect the position of the target object, the horizontal and/or vertical azimuths of the target object relative to the vehicle 500, and the distance of the target object relative to the vehicle 500.

Alternatively, the millimeter-wave radar 24 can be configured to output the received echoes as measurement signals to the control apparatus 100. At that time, the control circuit 100 can be configured to perform predetermined signal processing based on the received measurement signals, i.e. echoes, from a target object to thereby detect the position of the target object, the horizontal and/or vertical azimuths of the target object relative to the vehicle 500, and the distance of the target object relative to the vehicle 500.

A laser radar, i.e. a lidar, can be used in place of the millimeter-wave radar 24.

Each of the wheel speed sensors 25 is mounted to the corresponding one of the front wheels 501 of the vehicle 500. Each of the wheel speed sensors 25 is configured to output a measurement signal indicative of the rotational speed of the corresponding one of the front wheels 501. For example, each of the wheel speed sensors 25 outputs, as the measurement signal, a pulse signal comprised of pulses having intervals therebetween. Each of the pulses has a voltage level that represents a corresponding wheel speed at a corresponding timing, or each interval of the pulses represents a corresponding wheel speed at a corresponding timing. Upon receiving the measurement signal from each wheel speed sensor 25, the control apparatus 100 can calculate the travelling speed of the vehicle 500 and a traveled distance of the vehicle 500.

The GPS sensor 26 includes a receiver and a controller. The receiver receives GPS signals from GPS satellites, and the controller determines the current location of a predetermined point, such as the center of gravity, of the vehicle 500 based on the received GPS signals. Then, the controller sends, to the control apparatus 100, a measurement signal indicative of the current location of the vehicle 500. The current location of the vehicle 500 can be expressed as a corresponding longitude and a corresponding latitude. If map data indicative of diagrammatic representation of the areas through which the vehicle 500 can travel is stored in the memory 102, the control apparatus 100 can map the current location of the vehicle 500 on the map data to generate map information 60 stored in the memory 102, and can determine road-related information including at least the shape and conditions of the road on which the vehicle 500 is travelling.

If the control apparatus 500 can communicate with other vehicles around the vehicle 500 and/or communicate with a vehicle information center, the control apparatus 500 can receive the travelling conditions of the other vehicles, traffic-jam and other information the travelling road and other roads as the road-related information. If the control apparatus 500 can communicate with traffic-information infrastructures, the control apparatus 500 can receive traffic information from the traffic-information infrastructures as the road-related information.

The informing device 50 includes, for example, at least one of a visible output device, such as a display on the dashboard panel, and an audible output device, such as a speaker. The informing device 50 is configured to provide, to a driver of the vehicle 500, visible and/or audible information.

The CPU 101 functionally includes a transfer ratio setter M1, a target deviation angle calculator M2, and a target turning angle calculator M3. For example, upon the CPU 101 executing a corresponding at least one of the programs stored in the memory 102, the CPU 101 serves as each of the functional modules M1 to M3.

For example, the CPU 101 executes the transfer ratio setting program P2 to thereby serve as the transfer ratio setter M1.

The transfer ratio setter M1 variably determines a value of the transfer ratio $\alpha$ in accordance with whether the control apparatus 100 is operating in the automatic steering mode or the manual steering mode. As described above, the transfer ratio $\alpha$ represents the ratio of the amount of change, referred to as $\Delta\theta w$, of the turning angle $\theta w$ to the amount of change, referred to as $\Delta\theta s$, of the steering angle $\theta s$ as described above. That is, the transfer ratio $\alpha$ is expressed by $\alpha = \Delta\theta w / \Delta\theta s$.

According to the first embodiment, a value of the transfer ratio $\alpha$ in the automatic mode is set to a transfer ratio $\alpha_{auto}$, and a value of the transfer ratio $\alpha$ in the manual steering mode is set to a transfer ratio $\alpha_{man}$. The transfer ratio setter M1 is configured to set the transfer ratio $\alpha_{auto}$ in the automatic steering mode to be higher than the transfer ratio $\alpha_{man}$ in the manual steering mode, because, in the automatic steering mode, it is necessary to reduce rotational movement of the steering wheel 41. In particular, the transfer ratio setter M1 is configured to change the transfer ratio $\alpha_{auto}$ in the automatic steering mode depending on the driver's body posture.

Specifically, the transfer ratio setter M1 includes a body posture parameter obtainer M1A and a transfer ratio adjuster M1B described later.

For example, the CPU 101 executes the automatic steering control program P1 to thereby serve as the target turning angle calculator M3 in the automatic steering mode.

That is, the target turning angle calculator M3 calculates a value of the target turning angle θw* in the manual steering mode, and also calculates a value of the target turning angle θw* in the automatic steering mode.

In particular, in the automatic steering mode, the target turning angle calculator M3 calculates a value of the target turning angle θw* to which the turning drive unit 32 should adjust the turning angle θw in accordance with 1. The travelling conditions based on the measurement signals, i.e. frame images, sent from the front camera 22, the measurement signals sent from the millimeter-wave radar 24, the measurement signal sent from the wheel speed sensors 25, and the measurement signal sent from the GPS sensor 26
2. The road-related information including the map information 60

More specifically, the target turning angle calculator M3 calculates, independently of input from the driver's operation of the steering wheel 41, the target turning angle θw* in accordance with 1. First information indicative of the travelling speed of the vehicle 500
2. Second information indicative of the current location of the vehicle 500
3. Third information indicative of obstacles located around the vehicle 500, such as other vehicles located at sides of or in front of the vehicle 500
4. Fourth information indicative of the road on which the vehicle 500 is travelling has a substantially straight shape or a curved shape
5. Fifth information indicative of the number of lanes of the road on which the vehicle 500 can travel
6. Sixth information indicative of whether the road is a sloping road The first information, second information, and third information constitute the travelling conditions of the vehicle 500, and the fourth information, fifth information, and sixth information constitute the road-related information.

Then, the target turning angle calculator M3 sends the target turning angle θw* to the turning drive unit 32 in the automatic steering mode.

The second motor controller 32b of the turning drive unit 32 receives the target turning angle θw* sent from the target turning angle calculator M3. Then, the second motor controller 32b converts the target turning angle θw* into a target torque command required for the turning motor 32a to turn the turning angle θw to the target turning angle θw*. Thereafter, the second motor controller 32b controls the turning motor 32a based on the target torque command to adjust the turning angle θw to the target turning angle θw*.

In addition, the CPU 101 executes a corresponding at least one program stored in the memory 102 to thereby serve as the target deviation-angle calculator M2 in the automatic steering mode.

The target deviation angle calculator M2 in the automatic steering mode is configured to calculate, based on the transfer ratio α and the turning angle θw measured by the rotational angle sensor 21, a value of the target deviation angle θg* to which the steering drive unit 31 should adjust the deviation angle θg* in controlling the steering angle θs.

For example, the target deviation angle calculator M2 calculates a value of the target deviation angle θg* in the automatic steering mode in accordance with the following equation (1):

$$\theta g^* = (1 - 1/\alpha)\theta w \tag{1}$$

In the equation (1), the target turning angle θw* can be used in place of the turning angle θw.

Then, the first motor controller 31b of the steering drive unit 31 receives the target deviation angle θg* sent from the target deviation angle calculator M2. Then, the first motor controller 31b calculates a value of the target steering angle θs* based on the target deviation angle θg* and the target turning angle θw*

Thereafter, the first motor controller 31b converts the target steering angle θs* into a target torque command required for the steering motor 31a to turn the steering angle θs to the target steering angle θs*. Thereafter, the first motor controller 31b controls the steering motor 31a based on the target torque command to adjust the steering angle θs to the target steering angle θs*.

Note that the first motor controller 31b can calculate the amount of change, referred to as Δθs*, of the target steering angle θs* in place of the target steering angle θs*, and can control the steering motor 31a based on the amount of change Δθs* of the target steering angle θs*. That is, the first motor controller 31b can add the amount of change Δθs* of the target steering angle θs* to a current value of the steering angle θs, thus calculating a target torque command that should be instructed to the steering motor 31a. Note that rotational movement of the steering wheel 41 visually recognized by the driver represents the amount of change, and the target torque command to be instructed to the steering motor 31a represents a command value required for rotating the steering angle θs to the target steering angle θs*.

In contrast, the target deviation angle calculator M2 calculates, based on the steering angle θs measured by the steering sensor 20, a value of the target deviation angle θg* in the manual steering mode in accordance with the following equation (2):

$$\theta g^* = (\alpha - 1)\theta s \tag{2}$$

Then, the target deviation angle calculator M2 sends the calculated target deviation angle θg* to the target turning angle calculator M3 in the manual steering mode.

For example, the CPU 101 executes the manual steering program P0 to thereby serve as the target turning angle calculator M3 in the manual steering mode.

That is, the target turning angle calculator M3 calculates a value of the target turning angle θw* in the manual steering mode in accordance with the target deviation angle θg* received from the target deviation angle calculator M2 and the steering angle θs.

Then, the target turning angle calculator M3 sends the target turning angle θw* to the turning drive unit 32 in the automatic steering mode.

The second motor controller 32b of the turning drive unit 32 receives the target turning angle θw* sent from the target turning angle calculator M3. Then, the second motor controller 32b converts the target turning angle θw* into a target torque command required for the turning motor 32a to turn the turning angle θw to the target turning angle θw*. Thereafter, the second motor controller 32b controls the turning motor 32a based on the target torque command to adjust the turning angle θw to the target turning angle θw*.

Note that, because the steering mechanism 40 is designed as the steer-by-wire configuration, it is possible to calculate the target steering angle θs* to which the steering drive unit 31 should adjust the steering angle θs in accordance with the actual turning angle θw in the automatic steering mode. That is, the target deviation angle calculator M2 can calculate a value of the target steering angle θs* in the automatic steering mode in accordance with the following equation (3) without calculating the target deviation angle θg*:

$$\theta s^* = \theta w/\alpha \quad (3)$$

In addition, because the steering mechanism 40 is designed as the steer-by-wire configuration, it is possible to calculate the target turning angle θw* to which the turning drive unit 32 should adjust the turning angle θw in accordance with the actual steering angle θs. That is, the target deviation angle calculator M2 can serve as a target turning angle calculator to directly calculate a value of the target turning angle θw* in the manual steering mode in accordance with the following equation (4):

$$\theta w^* = \alpha \theta s \quad (4)$$

Note that the second motor controller 32b can calculate the amount of change, referred to as Δθw*, of the target turning angle θw* in place of the target turning angle θw*, and can control the turning motor 32a based on the amount of change Δθw* of the target turning angle θw*. That is, the second motor controller 32b can add the amount of change Δθw* of the target turning angle θw* to a current value of the turning angle θw, thus calculating a target torque command that should be instructed to the turning motor 32a.

As described above, the CPU 101 executes the automatic steering control program P1 to thereby execute the automatic steering mode. Note that the automatic steering mode according to the first embodiment corresponds to Level 3 at which the steering assist system 10 does not require the driver's holding of the steering wheel 41 in the internationally determined six levels Level 0 to Level 5.

Specifically, the CPU 101, i.e. the target turning angle calculator M3, determines a target travelling course for the vehicle 500 on which the vehicle 500 is going to travel in accordance with (1) Information indicative of obstacles located around the vehicle 500, such as other vehicles located at sides of or in front of the vehicle 500, which measured by the front camera 22 and the millimeter-wave radar 24

(2) Information indicative of road-related information including the map information 60, i.e. the target turning angle calculator M3

Then, the CPU 101, i.e. the target turning angle calculator M3, periodically determines a value of the target turning angle θw* to which each of the front wheels 501 should be adjusted in accordance with (1) The target travelling course (2) A value of the travelling speed of the vehicle 500 periodically calculated based on the measurement signals sequentially received from the wheel speed sensors 25

(3) The map information 60 on which the current location of the vehicle 500 has been being mapped Then, the CPU 101, i.e. the target turning angle calculator M3, periodically sends the value of the target turning angle θw* to the turning drive unit 32. The second motor controller 32b of the turning drive unit 32 receives the value of the target turning angle θw* periodically sent from the target turning angle calculator M3, and the second motor controller 32b periodically converts the value of the target turning angle θw* into a target torque command required for the turning motor 32a to turn the corresponding value of the turning angle θw to the target turning angle θw*. Thereafter, the second motor controller 32b periodically controls the turning motor 32a based on the corresponding target torque command to periodically adjust the turning angle θw to the corresponding target turning angle θw*.

The automatic steering mode can use previously programmed travelling courses for determining the travelling course on which the vehicle 500 is going to travel or determining the target turning angle θw. The automatic steering mode can also use radio guidance information sent from guidance-information providing devices, such as beacons, established along the travelling road for determining the travelling course on which the vehicle 500 is going to travel or determining the target turning angle θw.

As described above, the CPU 101 in the automatic steering mode changes the steering angle θs of the steering wheel 41 in accordance with change of the turning angle θw controlled by the turning drive unit 32. Specifically, in the automatic steering mode, the steering wheel 41 is turned based on the target steering angle θs*; the target steering angle θs* is determined based on the target deviation angle θg* and the target turning angle θw*. Note that, because a specific rotational movement of the steering wheel 41 is represented as the amount of change Δθs of the steering angle θs, and the amount of change Δθs of the steering angle θs can be expressed by (Δθs=Δθg−Δθw), and the amount of change Δθg of the deviation angle θg can be expressed by Δθg=(1−1/α$_{auto}$)Δθw.

The CPU 101 can be configured to execute the automatic steering mode in accordance with at least one of (1) Only steering assistance control for assisting only the steering of the vehicle 500 in accordance with the travelling conditions of the vehicle 500 and the road-related information (2) Automatic control for assisting each of the power running, braking, and steering of the vehicle 500 in accordance with the travelling conditions of the vehicle 500 and the road-related information Note that an automatic control switch SW1, which is designed as an occupant-operable on-off switch, can be provided in the interior of the vehicle 500, and is communicably connected to the CPU 101 via the I/O interface 103. That is, occupant's turning on the automatic control switch SW1 causes the CPU 101 to continuously execute the automatic control for assisting each of the power running, braking, and steering of the vehicle 500 until the automatic control switch SW1 is turned off.

In addition, the CPU 101 can be configured to execute the automatic steering mode when the driver wants to park the vehicle 500 to a predetermined parking area or wants to start the vehicle 500 parked in a predetermined parking area.

Additionally, during execution of the automatic steering mode, the CPU 101 can be configured to interrupt the automatic steering mode and to perform the manual steering mode upon determining that the driver of the vehicle 500 intentionally turns the steering wheel 41 based on, for example, the steering torque or the steering angle measured by the steering sensor 20.

After interrupting the automatic steering mode and executing the manual steering mode, the CPU 101 can terminate the manual steering mode and restart the automatic steering mode upon determining that no turning operations of the driver have been measured for a predetermined threshold period since the interruption of the automatic steering mode.

Figure 4:
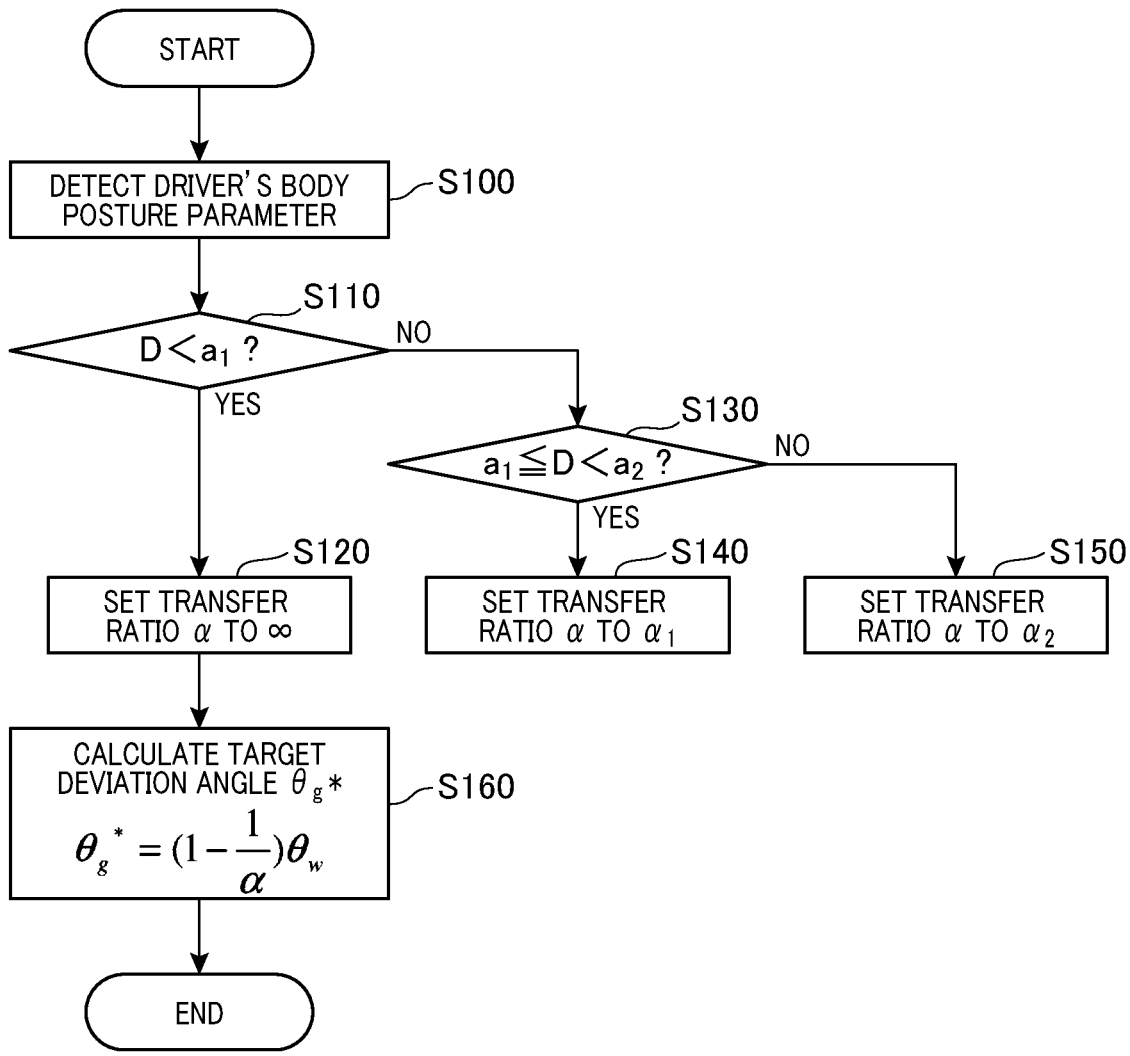
FIG. 4 is a flowchart schematically illustrating an example of a transfer ratio setting routine executed by the steering assist system.

The following describes a transfer ratio setting routine carried out by the CPU 101 with reference to FIGS. 4 and 5. The CPU 101 can be programmed to start the transfer ratio setting routine upon the automatic steering switch SW being turned on by a driver.

The CPU 101 can be programmed to execute the transfer ratio setting routine every predetermined period after turnon of the automatic steering switch SW. Hereinafter, one transfer ratio setting routine periodically performed by the CPU 101 will be referred to as a cycle.

Upon starting the transfer ratio setting routine, the CPU 101 serves as the body posture parameter obtainer M1A to detect a driver's body posture parameter depending on the driver's body posture in step S100. Note that the body posture parameter obtainer M1A corresponding to the operation in step S100 and the vehicle interior camera 23 serve as, for example, a body posture parameter detector.

In particular, the CPU 101 of the first embodiment detects at least the driver's body posture parameter depending on the tip of each of right and left hands of the driver as a part of the driver's body posture.

For example, the CPU 101 obtains, from the vehicle interior camera 23, three-dimensional (3D) image data of the upper body of the driver if a stereo camera is used as the vehicle interior camera 23, and stores, in a 3D storage space of the memory 102, the 3D image data. Note that the 3D storage space SS simulates a 3D coordinate space CS that has three predetermined axes X, Y, and Z from a predetermined point of the vehicle interior camera 23 defined as an origin point, so that any point in the 3D coordinate space CS can be specified as coordinates (x, y, z) in the respective axes X, Y, and Z.

Next, the CPU 101 extracts, from the 3D image data of the upper body of the driver, predetermined feature points of the driver's upper body; the feature points enable a 3D frame structure of the driver's upper body to be constructed. For example, the feature points include the center of the head, the center of each of the left and right shoulders, the center of the left and right elbows, the center of the left and right wrists, and the tip of each of the right and left hands of the driver.

Then, the CPU 101 identifies the coordinates (x, y, z) of each of the feature points in the 3D image data stored in the 3D storage space SS of the memory 102. After the identification, the CPU 101 links the feature points from one another in the 3D storage space SS, thus obtaining a 3D frame structure of the driver's upper body.

Next, the CPU 101 compares 3D image data items periodically captured by the vehicle interior camera 23 and periodically sent from the vehicle interior camera 23 with the 3D frame structure of the driver's body, to thereby monitor how each of the feature points is changed over time.

This enables the CPU 101 to identify the driver's body posture at a desired timing, thus identifying the position of the tip of each of the right and left hands at a desired timing.

The above technology for identifying the body posture of an object is well known as markerless motion capture technology. For example, using Microsoft Kinect® technology enables the body posture of the object to be identified.

As described above, if a stereo camera is used as the vehicle interior camera 23, the CPU 101 enables a distance between each feature point of the driver's upper body and the origin of the 3D coordinate space CS to be calculated using triangulation.

For example, if the X, Y, and Z axes of the three-dimensional space are respectively defined to be substantially parallel with the vehicle width direction, i.e. the horizontal direction, the height direction, i.e. vertical direction, and the longitudinal direction of the vehicle 500 (see FIG. 5), the z coordinate of each feature point corresponds to a distance of the feature point from the origin point O.

If a monocular camera is used as the vehicle interior camera 23 and a depth sensor is installed in the vehicle 500, the z coordinate of each feature point, which corresponds to a distance of the feature point from the origin point O, is measured by the depth sensor.

The CPU 101 can be configured to track the coordinates of the feature point corresponding to the tip of each of the right and left hands of the driver as a part of the driver's body posture on the basis of the 3D frame structure, thus continuously detecting the coordinates of the tip of each of the right and left hands of the driver. Moreover, the CPU 101 can be configured to track the coordinates of the feature point corresponding to the tip of each of the right and left hands of the driver as a part of the driver's body posture without constructing the 3D frame structure, thus continuously detecting the coordinates of the tip of each of the right and left hands of the driver.

In place of the vehicle interior camera 23, at least two optical sensors, such as infrared sensors, can be installed in the interior of the vehicle body 505; each of the optical sensors is configured to output an optical beam. That is, each of the optical sensors is located at a predetermined distance relative to the steering wheel 41 to face a driver seat, i.e. a driver, in the direction of the Z axis. Each of the optical sensors is capable of detecting how the corresponding optical beams are blocked by movement of the driver's body posture. The CPU 101 can be configured to detect the driver's body posture in accordance with how the optical beam output from each of the optical sensors is blocked by movement of the driver's body posture.

Following the operation in step S100, the CPU 101 serves as the transfer ratio adjuster M1B to adjust the transfer ratio $\alpha$ in accordance with a physical position relationship between the tip, referred to as BD, of each of the right and left hands of the driver and the steering wheel 41 in steps S110 to S150.

Specifically, the CPU 101 detects the minimum distance, i.e. the Euclidean minimum distance, D between the tip, referred to as BD, of each of the right and left hands of the driver and a predetermined position of the steering wheel 41, and determines whether the minimum distance D is smaller than a predetermined first threshold a1 in step S110.

The minimum distance D represents, for example, the minimum distance between a predetermined point, such as a center, of the surface 412a of the hub 412 and the tip BD of each of the right and left hands of the driver. That is, the CPU 101 calculates the coordinates of the predetermined point of the surface 412a of the hub 412 in the 3D coordinate space CS, and calculates the minimum distance D between the coordinates of the predetermined point of the surface 412a of the hub 412 in the 3D coordinate space CS and the coordinates of the tip BD of each of the right and left hands of the driver in the 3D coordinate space CS.

As another example, the minimum distance D represents, for example, the minimum distance between the tip BD of each of the right and left hands of the driver and a portion of the first surface 411a of the rim 411 and the tip BD; the portion of the first surface 411a of the rim 411 is the closest to the driver seat. That is, the CPU 101 calculates the coordinates of the portion the first surface 411a of the rim 411 in the 3D coordinate space CS, and calculates the minimum distance D between the coordinates of the portion of the surface 411a of the rim 411 in the 3D coordinate space CS and the coordinates of the tip BD of each of the right and left hands of the driver in the 3D coordinate space CS.

The first threshold a1 is determined such that, if the tip BD of at least one of the right and left hands of the driver is being abutted onto, i.e. in contact with, the steering wheel 41 or is likely to be being abutted onto the steering wheel 41, the minimum distance D between the tip BD of at least one of the right and left hands of the driver and the steering wheel 41 becomes definitely smaller than the first threshold a1. For example, the first threshold a1 is set to a positive distance with a predetermined margin.

If the minimum distance between a predetermined point of the surface 412a of the hub 412 and the tip BD of each of the right and left hands of the driver is used as the minimum distance D, the minimum distance difference between the predetermined point of the surface 412a of the hub 412 and the portion of the first surface 411a of the rim 411 and the tip BD, which is the closest to the driver seat, can be used as the first threshold a1.

Upon determining that the minimum distance D between the tip BD of at least one of the right and left hands of the driver and the steering wheel 41 is smaller than the first threshold a1 (YES in step S110), the CPU 101 sets the transfer ratio $\alpha$ to an infinite value ($\infty$) in step S120. Thereafter, the transfer ratio setting routine proceeds to step S160.

In step S160 after the operation in step S120, the CPU 101 serves as the target deviation angle calculator M2 to calculate the target deviation angle $\theta g^*$ in accordance with the equation (1) set forth above.

At that time, because the transfer ratio $\alpha$ is set to an infinite value o, the equation (1), which is $\theta g^* = (1-1/\alpha) \theta w$, results in the target deviation angle $\theta g^*$ being set to the turning angle $\theta w$. Because the target steering angle $\theta s^*$ is represented as "$\theta s^* = \theta w - \theta g^*$", the operation in step S160 results in the target steering angle $\theta s^*$ being set to zero. This prevents the steering wheel 41 from being turned simultaneously with turning of each of the front wheels 501. This, in other words, prevents the steering wheel 41 from being moved.

This therefore reduces or prevents unintentional contacts or interferences between the steering wheel 41 and the tip BD of at least one of the right and left hands of the driver. Note that unintentional contacts between the steering wheel 41 and the tip BD of at least one of the right and left hands of the driver mean contacts between the turning steering wheel 41 and the tip BD of at least one of the right and left hands of the driver. In addition, interference between the steering wheel 41 and the tip BD of at least one of the right and left hands of the driver means (1) A first situation where a portion of the turning steering wheel 41, such as a spoke 413 of the turning steering wheel 41, is abutted onto the tip BD of at least one of the right and left hands of the driver (2) A second situation where the tip BD of at least one of the right and left hands of the driver becomes entangled with the spokes 413

Interrupting turning of the steering wheel 41 in synchronization with turning of the front wheels 501 prevents driver's contacts with the steering wheel 41 interfering with turning of each of the front wheels 501.

Upon determining that the minimum distance D between the tip BD of at least one of the right and left hands of the driver and the steering wheel 41 is equal to or larger than the first threshold a1 (NO in step S110), the CPU 101 determines whether the minimum distance D is equal to or larger than the first threshold a1 and lower than a predetermined second threshold a2 in step S130.

The second threshold a2 is determined such that, if the tip BD of at least one of the right and left hands of the driver is likely to contact the steering wheel 41, the minimum distance D between the tip BD of at least one of the right and left hands of the driver and the steering wheel 41 becomes definitely smaller than the second threshold a2. The second threshold a2 is set to be larger than the first threshold a1.

Upon determining that the minimum distance D between the tip BD of at least one of the right and left hands of the driver and the steering wheel 41 is equal to or larger than the first threshold a1 and smaller than the second threshold a2 (YES in step S130), the CPU 101 sets the transfer ratio $\alpha$ to a first value $\alpha 1$ in step S140. Thereafter, the transfer ratio setting routine proceeds to step S160.

In step S160 after the operation in step S140, the CPU 101 calculates the target deviation angle $\theta g^*$ in accordance with the equation (1) set forth above.

The first value $\alpha 1$ of the transfer ratio $\alpha$ is determined to enable a value of the amount of change $\Delta \theta s$ of the steering angle $\theta s$ to be established; the value of the amount of change $\Delta \theta s$ prevents the driver from having a feeling of strangeness or a feeling of anxiety about turning of the steering wheel 41, and reduces unnecessary turning of the steering wheel 41. For example, the first value $\alpha 1$ of the transfer ratio $\alpha$ is set to 1 or thereabout.

Upon determining that the minimum distance D between the tip BD of at least one of the right and left hands of the driver and the steering wheel 41 is equal to or larger than the second threshold a2 (NO in step S130), the CPU 101 sets the transfer ratio $\alpha$ to a second value a2 in step S150. Thereafter, the transfer ratio setting routine proceeds to step S160.

In step S160 after the operation in step S140, the CPU 101 calculates the target deviation angle $\theta g^*$ in accordance with the equation (1) set forth above.

The second value $\alpha 2$ of the transfer ratio $\alpha$ is the transfer ratio $\alpha_{auto}$ that is previously set as a reference value, i.e. a default value, in the automatic steering mode, and is set to be smaller than the first value $\alpha 1$ and smaller than 1. That is, the second value $\alpha 2$ of the transfer ratio $\alpha$ results in the steering angle $\theta s$ and the amount of change $\Delta \theta s$ of the steering angle $\theta s$ becoming respectively larger than the turning angle $\theta w$ and the amount of change $\Delta \theta w$ of the turning angle $\theta x$. This enables the amount of change $\Delta \theta s$ of the steering angle $\theta s$ to be sufficiently ensured even if the amount of change $\Delta \theta w$ of the turning angle $\theta x$ becomes relatively small. This therefore makes it possible to prevent or reduce the driver from having a feeling of strangeness and a feeling of anxiety in the automatic steering mode.

Note that the execution order of the determination in step S110 and the determination in step S130 can be reversed.

In step S160, the CPU 101 sends the calculated target deviation angle $\theta g^*$ to the steering drive unit 31, and thereafter terminates the transfer ratio setting routine.

When receiving the target deviation angle $\theta g^*$, the steering drive unit 31 calculates the target steering angle $\theta s^*$ in accordance with the above equation (3), and adjusts the steering angle $\theta s$ to the target steering angle $\theta s^*$.

The steering assist system 10 according to the first embodiment is configured to adjust the transfer ratio $\alpha$, which represents the ratio of the amount of change of the turning angle $\theta w$ to the amount of change of the steering angle $\theta s$, in the automatic steering mode depending on the driver's body posture. This configuration enables, in the automatic steering mode, the steering wheel 41 to be variably turned suitable for change of the driver's body posture.

Specifically, this configuration of the steering assist system 10 is configured to set the transfer ratio $\alpha$ to an infinite value ($\infty$) if it is determined that the driver has a posture that a part of the driver is being abutted onto or interfering with the steering wheel 41 or is likely to be being abutted onto or interfering with the steering wheel 41, resulting in the target steering angle $\theta s^*$ being set to zero.

This prevents the steering wheel 41 from being turned simultaneously with turning of each of the front wheels 501 while a part of the driver, such as the tip BD of at least one hand, a wrist, or an arm, is being abutted onto the steering wheel 41 or is likely to be being abutted onto or interfere with the steering wheel 41, such as its spoke 41 or rim 411. In particular, this configuration more efficiently protects the driver's body if the turning speed of the steering wheel 41 had been high.

Additionally, this configuration of the steering assist system 10 reduces or prevents uncontrolled behaviors of the vehicle 500 due to contact or interference between the driver and the steering wheel 41, resulting in more stable travelling behaviors of the vehicle 500. Note that this configuration of the steering assist system 10 can set the transfer ratio $\alpha$ to a finite value if it is determined that the driver has a posture that a part of the driver is being abutted onto the steering wheel 41 or is likely to be being abutted onto or interfere with the steering wheel 41; this finite value enables the amount of change $\Delta\theta s$, such as 0.5 degrees, of the steering angle $\theta s$, to be sufficiently smaller than the amount of change $\Delta\theta w$ of the turning angle $\theta w$, such as 35 degrees.

The steering assist system 10 according to the first embodiment is also configured to set the transfer ratio $\alpha$ to the first value $\alpha 1$, which is larger than the default value $\alpha_{auto}$, in the automatic control mode, if it is determined that the driver has a posture that a part of the driver is likely to contact onto or interfere with the steering wheel 41. This enables the driver to visibly recognize turning of the steering wheel 41 in the automatic steering mode, making it possible to (1) Prevent or reduce the driver from having a feeling of strangeness and a feeling of anxiety (2) Reduce unnecessary turning of the steering wheel 41 to thereby protect the driver's body Note that the expression "setting the transfer ratio $\alpha$ to a value" can be alternatively expressed as "changing or adjusting the transfer ratio $\alpha 1_{auto}$ to a value suitable for the driver's body posture.

Second Embodiment

Figure 6:
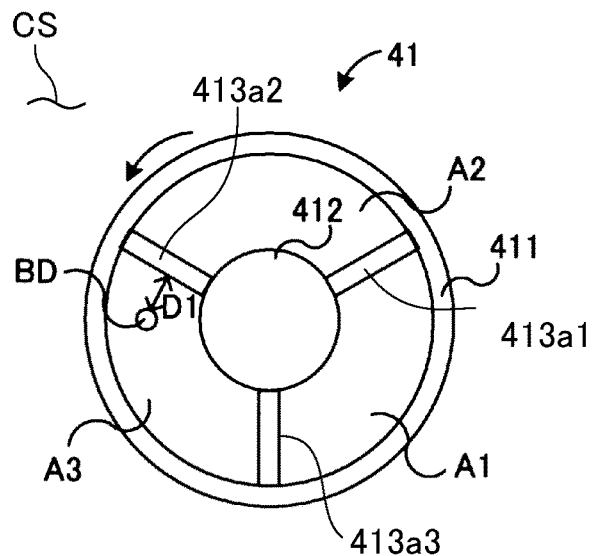
FIG. 6 is a view schematically illustrating a physical position relationship between a tip of a hand of a driver, which is an example of a part of the driver, and a steering wheel detected by the steering assist system according to the second embodiment of the present disclosure.

The following describes the second embodiment of the present disclosure with reference to FIG. 6. The second embodiment differs from the first embodiment in the following points. So, the following mainly describes the different points, and omits or simplifies descriptions of like parts between the first and second embodiments, to which identical or like reference characters are assigned, thus eliminating redundant description.

The steering assist system 10 according to the first embodiment is configured to (1) Adopt, as a parameter indicative of the physical position relationship between the driver's body posture and the steering wheel 41, the minimum distance D between the tip BD of each of the right and left hands of the driver and the steering wheel 41

(2) Adjust the transfer ratio $\alpha$ based on whether a part of the driver is being abutted onto the steering wheel 41, or based on whether a part of the driver is likely to be being abutted onto the steering wheel 41

In contrast, a steering assist system according to the second embodiment is configured to (1) Have a predetermined at least one attention region in the 3D coordinate space CS, which is rotated together with rotation of the steering wheel 41

(2) Adopt, as a parameter indicative of the positional relationship between the driver's body posture and the steering wheel 41, a Euclidean minimum distance D1 between the tip BD of each of the right and left hands of the driver and the at least one attention region (3) Adjust the transfer ratio $\alpha$ based on change of the minimum distance D1, i.e. increase the transfer ratio $\alpha$ with a decrease of the minimum distance D1

That is, the steering assist system according to the second embodiment is configured to adopt the parameter associated with both the driver's body posture and the steering wheel 41 and the rotational movement of the steering wheel 41.

As illustrated in FIG. 6, the steering wheel 41 is comprised of three spokes 413a1, 413a2, and 413a3 that connect the ring rim 411 and the hub 412 and spaced apart by substantially 120 degrees.

The second embodiment uses, as the at least one attention region, first to third sector spaces A1 to A3 as first to third attention regions. The first sector region A1 is defined among the hub 412, the rim 411, and the first and second spokes 413a1 and 413a2, the second sector region A2 is defined among the hub 412, the rim 411, and the second and third spokes 413a2 and 413a3, and the third sector region A3 is defined among the hub 412, the rim 411, and the third and first spokes 413a3 and 413a1.

Each of the first to third sector spaces, i.e. first to third attention regions, A1 to A3 can be defined as a coordinate region comprised of a corresponding group of coordinates (x, y, z) in the 3D coordinate space CS.

The CPU 101 enables a group of coordinates (x, y, z) of each of the first to third spokes A1 to A3 to be specified in the 3D coordinate space CS based on an image captured by the vehicle interior camera 23 and the steering angle $\theta s$ measured by the steering sensor 20. This enables the CPU 101 to specify any point in each of the first to third attention regions A1 to A3 in the 3D coordinate space CS. Like the first embodiment, the CPU 101 can specify the coordinates (x, y, z) of the tip BD of each of the right and left hands of the driver in the 3D coordinate space CS.

This therefore enables the CPU 101 to obtain a value of the minimum distance D1 between a corresponding one of the first to third attention regions A1 to A3 and the tip BD of each of the right and left hands of the driver in the 3D coordinate space CS. Because the minimum distance D1 between a corresponding one of the first to third attention regions A1 to A3 and the tip BD of each of the right and left hands of the driver in the 3D coordinate space CS varies depending on turning of the steering wheel 41, the CPU 101 can be configured to perform at least one of (1) A task of discretely sample values of the minimum distance D1 to thereby discretely calculate values of the transfer ratio $\alpha$; each of the calculated values of the transfer ratio $\alpha$ is based on the corresponding one of the sampled values of the minimum distance D1 (see steps S100 to S160)

(2) A task of continuously sample a value of the minimum distance D1 to thereby continuously calculate a value of the transfer ratio $\alpha$; each of the calculated values of the transfer ratio $\alpha$ is based on the corresponding one of the sampled values of the minimum distance D1 (see steps S100 to S160)

The steering assist system according to the second embodiment is therefore configured to adjust the transfer ratio $\alpha$ in the automatic steering mode in accordance with change of the minimum distance D1 between the tip BD of each of the right and left hands of the driver and a corresponding one of the first to third attention regions A1 to A3. This configuration therefore prevents the tip BD of each of the right and left hands of the driver from hitting the steering wheel 41 or reduces discomfort due to the hitting of the tip BD of each of the right and left hands of the driver to the steering wheel 41. This therefore makes it possible to protect the driver, and prevent or restrict uncontrolled behaviors of the vehicle 500.

Third Embodiment

Figure 7:
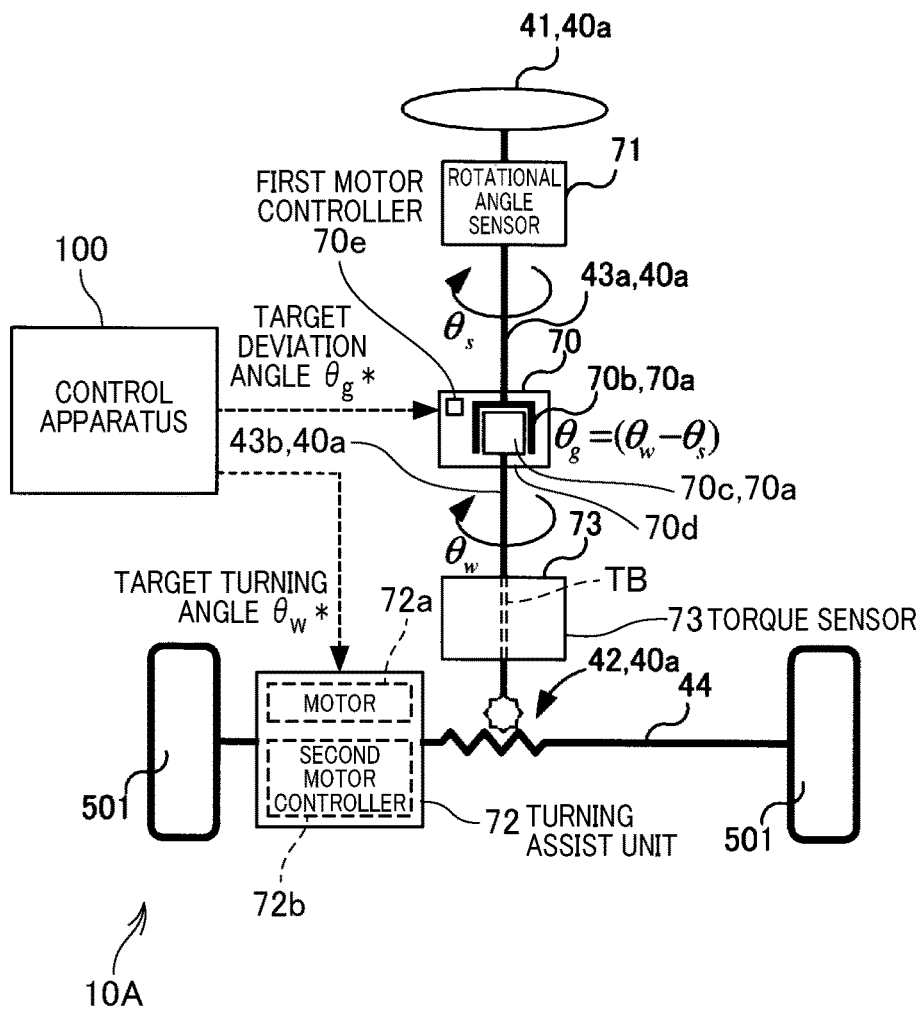
FIG. 7 is a functional and structural diagram schematically illustrating a hardware structure of a steering mechanism and illustrating a control apparatus for controlling the steering mechanism according to the second embodiment of the present disclosure is installed.

The following describes the third embodiment of the present disclosure with reference to FIG. 7. The third embodiment differs from the first embodiment in the following points. So, the following mainly describes the different points, and omits or simplifies descriptions of like parts between the first and third embodiments, to which identical or like reference characters are assigned, thus eliminating redundant description.

The steering assist system 10 according to the first embodiment includes the steer-by-wire steering mechanism 40.

In contrast, a steering assist system 10A according to the third embodiment includes a steering mechanism 40a, a rotational angle sensor 71, a turning assist unit 72, and a torque sensor 73. The steering mechanism 40a includes an angle adjuster 70 that mechanically couples the steering wheel 41 and the turning mechanism 42.

Specifically, the steering mechanism 40a is comprised of, for example, the steering wheel 41, the turning mechanism 42, the upper steering shaft 43a, the lower steering shaft 43b, and the turning axles 44.

The upper steering shaft 43a has opposing first and second ends, and the steering wheel 41 is mounted to the first end of the upper steering shaft 43a. The second end of the upper shaft 43a is rotatably connected to the angle adjuster 70.

The rotational angle sensor 71 is mounted to an axially middle portion of the upper steering shaft 43a. The rotational angle sensor 71 is configured to measure the steering angle θs of the steering wheel 41, i.e. a steering position of the steering wheel 41, as a rotational angle of the upper steering shaft 43a.

The lower steering shaft 43b has opposing first and second ends, and the first end of the lower steering shaft 43b is coupled to the angle adjuster 70. The second end of the lower steering shaft 43b is coupled to the turning mechanism 42.

The angle adjuster 70 is designed to continuously generate a variable deviation angle θg between the rotational angle, i.e. the steering angle θs, of the upper steering shaft 43a and the rotational angle of the lower steering shaft 43b, i.e. the turning angle θw of each front wheel 501.

For example, the angle adjuster 70 includes a motor 70a that is comprised of a tubular cylindrical stator 70b, a cylindrical rotor 70c, and an output shaft 70d. The angle adjuster 70 also includes a first motor controller 70e.

The motor 70a is designed as, for example, a brushless direct-current (DC) motor. The stator 70b is mounted to a tubular cylindrical housing, and the tubular cylindrical housing is coupled to the second end of the upper steering shaft 43a to be rotatable together with the upper steering shaft 43a. The rotor 70a is rotatably installed in the housing to be coaxial with the housing. The stator 70b is fixed to the inner surface of the housing so as to be coaxially arranged over the rotor 70c with a gap therebetween.

The motor 70a includes an output shaft around which the rotor 70c is coaxially mounted. That is, the motor 70a is configured to rotate the rotor 70c and the output shaft relative to the stator 70b when driven by the first motor controller 70e. The output shaft 70d of the motor 70a has an output end coupled to the first end of the lower steering shaft 43b via an unillustrated gear reducer.

The gear reducer is comprised of, for example, an epicyclic gear mechanism or a wave gear mechanism, and the gear mechanism of the gear reducer connects among the rotor 70c coupled to the lower steering shaft 43b, the stator 70b coupled to the upper steering shaft 43a, and the output shaft 70d of the motor 70a. The gear reducer is configured to determine, using a predetermined gear ratio, the deviation angle θg between the steering angle θs of the upper steering shaft 43a and the turning angle θw of the lower steering shaft 43b, which is expressed by θg=(θw−θs).

In other words, the rotational angle of the output shaft 70d of the motor 70a and the steering angle θs of the upper steering shaft 43a determine the turning angle θw of the lower steering shaft 43b. The motor 70a enables a relative angle between the housing, i.e. the steering shaft 43a, and the output shaft 70d to be variable, making it possible to continuously change the deviation angle θg between the steering angle θs of the steering wheel 41 and the turning angle θw of the lower steering shaft 43b.

The turning assist unit 72 includes a motor 72a and a second motor controller 72b. The motor 72a includes an output shaft whose output end is coupled directly to a pinion, or a pinion and a gear reducer coupled to the pinion. The pinion or gear reducer of the motor 72a is engaged with the rack of the turning mechanism 42. Torque generated by the motor 72a enables the rack to move in the horizontal direction, i.e. the vehicle width direction. This horizontal movement of the rack of the turning mechanism 42 results in horizontal movement of the turning axles 44, so that the front wheels 501 are turned. That is, controlling the rotational angle of the motor 72a of the turning assist unit 72 enables the front wheels 501 to be controllably turned.

The turning assist unit 72 serves as, for example, a turning mechanism driver, and drives the turning mechanism 42 independently of driver's steering force input from the steering wheel 41, thus setting a desired turning angle of each of the front wheels 501. Note that the motor 72a of the turning assist unit 72 can be coaxially mounted to one of the steering axles 44, or coaxially mounted to the lower steering shaft 43b, or integrally mounted to the turning assist unit 72.

Specifically, in the manual steering mode, a driver's turning operation of the steering wheel 41 inputs steering torque and a value of the steering angle θs to the angle adjuster 70.

In addition, in the manual steering mode, the control apparatus 100 determines a value of the target deviation angle θg* to the first motor controller 70e of the angle adjuster 70. Then, the first motor controller 70e of the angle adjuster 70 determines a value of the turning angle θw in accordance with the determined value of the deviation angle θg* and the value of the steering angle θs, which is expressed by θw=(θg*+θs).

The first motor controller 70e converts the determined value of the turning angle θw into a target torque command required for turning the lower steering shaft 43b by the determined value of the turning angle θw.

Then, the first motor controller 70e controls the motor 70a based on the target torque command to thereby cause the lower steering arm 43b to turn by the determined value of the turning angle θw. This results in the pinion of the turning mechanism 42 being rotated by the turning angle θw. Rotation of the pinion of the turning mechanism 42 by the turning angle θw enables the rack to move in the horizontal direction, i.e. the vehicle width direction. This horizontal movement of the rack of the turning mechanism 42 results in horizontal movement of the turning axles 44, so that the front wheels 501 are each turned by the turning angle θw.

In the automatic steering mode of the control apparatus 100, the control apparatus 100 determines a value of the target turning angle θw*. Then, the turning assist unit 72 drives its motor 72a in accordance with the determined value of the target turning angle θw* to thereby automatically drive the turning mechanism 42 so that the turning angle θw of each of the front wheels 501 is turned to the target turning angle θw*.

In the automatic steering mode, a value of the target deviation angle θg* is determined by the control apparatus 100 and sent therefrom to the first motor controller 70e of the angle adjuster 70. Then, the first motor controller 70e of the angle adjuster 70 determines a value of the steering angle θs in accordance with the determined value of the deviation angle θg* and the value of the turning angle θw of the lower steering shaft 43b, which is expressed by θs=(θw−θg*).

The first motor controller 70e converts the determined value of the steering angle θs into a target torque command required for turning the upper steering shaft 43a by the determined value of the steering angle θs.

Then, the first motor controller 70e controls the motor 70a based on the target torque command to thereby cause the upper steering arm 43a to turn by the determined value of the steering angle θs.

The rotational angle sensor 71 is configured to measure a rotational angle of the steering wheel 41, i.e. a steering position of the steering wheel 41, as the steering angle θs of the upper steering shaft 43a.

For example, the rotational angle sensor 71 measures the steering angle θs of the upper steering shaft 43a being zero degrees (0°) while the vehicle 500 is travelling straight ahead. The steering angle θs of the steering wheel 41 being zero degrees will be referred to as a reference angle or reference position of the steering wheel 41 hereinafter.

In addition, the rotational angle sensor 71 outputs, as a measurement signal, a positive value of the steering angle θs of the steering wheel 41, i.e. a positive value of the rotational angle θs of the upper steering shaft 43a, when the steering wheel 41 has turned rightward relative to the reference position of the steering wheel 41. Moreover, the rotational angle sensor 71 outputs, as the measurement signal, a negative value of the steering angle θs of the steering wheel 41, i.e. a negative value of the rotational angle θs of the upper steering shaft 43a, when the steering wheel 41 has turned leftward relative to the reference position of the steering wheel 41.

As another example, the rotational angle sensor 71 outputs, as the measurement signal, a positive absolute value of the steering angle θs of the steering wheel 41, i.e. a positive absolute value of the rotational angle θs of the upper steering shaft 43a, within 360 degrees and the number of rotations of the steering wheel 41.

The lower steering shaft 43b is comprised of unillustrated first and second shaft elements and a torsion bar TB connecting between the first and second shaft elements; the first shaft element is coupled to the angle adjuster 70, and the second shaft element is coupled to the pinion of the turning mechanism 42. Driver's steering operation of the steering wheel 41 causes the first shaft element to turn, so that the torsion bar TB is also turned in synchronization with turning of the first shaft member. At that time, the second shaft member is turned while being delayed with the turning of the first shaft member, resulting in the torsion bar TB being twisted relative to the second shaft member.

The torque sensor 73 measures a twist angle of the torsion bar TB as a phase difference between the torsion bar TB and the second shaft element, and converts the phase difference into steering torque. Then, the torque sensor 73 outputs a measurement signal indicative of the steering torque.

For example, the torque sensor 73 outputs a positive signal value of the steering torque when the steering wheel 41 has turned rightward relative to the reference position of the steering wheel 41, and outputs a negative signal value of the steering torque when the steering wheel 41 has turned leftward relative to the reference position of the steering wheel 41.

A rotational angle sensor for measuring the turning angle θw can be provided to be integral with the torque sensor 73. The torque sensor 73 can be provided to the upper steering shaft 43a.

The steering assist system 10A according to the third embodiment is configured to adjust the transfer ratio α, which represents the ratio of the amount of change of the turning angle θw to the amount of change of the steering angle θs, in the automatic steering mode depending on the driver's body posture, which is similar to the first embodiment. This configuration enables, in the automatic steering mode, the steering wheel 41 to be variably turned suitable for change of the driver's body posture. That is, the steering assist system 10A according to the third embodiment achieves substantially the same benefits as the benefits achieved by the steering assist system 10.

Modifications

The present disclosure is not limited to the above described embodiments, and can be variably modified within the scope of the present disclosure.

Each of the steering assist systems 10 and 10A according to the above embodiments is configured to adjust the transfer ratio α in accordance with, as the driver's body posture parameter depending on the driver's body posture measured by the vehicle interior camera 23, the minimum distance D between the tip BD of each of the right and left hands of the driver and the steering wheel 41, but the present disclosure is not limited to this configuration.

Specifically, each of the steering assist systems 10 and 10A can be configured to predict a future driver's body posture as the driver's body posture parameter based on a current driver's body posture measured by the vehicle interior camera 23 in step S100. For example, each of the steering assist systems 10 and 10A can be configured to predict a future driver's body posture as the driver's body posture parameter based on a current driver's body posture measured by the vehicle interior camera 23 in step S100. Specifically, each of the steering assist systems 10 and 10A can be configured to obtain temporal change characteristics of the position of a selected position in the 3D frame structure of the driver's body, such as the tip BD of each of the right and left hands of the driver in step S100. The temporal change characteristics of the position of the selected position include how the selected position has been accelerated and/or how the movement direction of the selected position has been changed. Then, each of the steering assist systems 10 and 10A can be configured to estimate the future driver's body posture based on the temporal change characteristics of the selected position of the driver's body.

Each of the steering assist systems 10 and 10A according to the above embodiments is configured to adjust the transfer ratio α in accordance with, as the driver's body posture parameter depending on the driver's body posture measured by the vehicle interior camera 23, the minimum distance D between the tip BD of each of the right and left hands of the driver and the steering wheel 41, but the present disclosure is not limited to this configuration.

Specifically, each of the steering assist systems 10 and 10A can be configured to adjust the transfer ratio α in accordance with, as the driver's body posture parameter depending on the driver's body posture measured by the vehicle interior camera 23, the driver's body posture measured by the vehicle interior camera 23 itself.

In the automatic steering mode, a driver may use a book or an information terminal, such as a smartphone. Thus, each of the steering assist systems 10 and 10A can be configured to adjust the transfer ratio ac to be greater upon estimating, based on the driver's body posture, that the driver holds any object. This prevents unintentional contacts or interferences between the steering wheel 41 and the object held by the driver.

Each of the steering assist systems 10 and 10A according to the above embodiments is configured to adjust the transfer ratio α in accordance with comparison between a value of the driver's body posture parameter and one or more threshold values, such as the first and second threshold values a1 and a2. Additionally, each of the steering assist systems 10 and 10A can be configured to cause the informing device 50 to provide, to the driver of the vehicle 500, visible and/or audible information indicative of the possibility of abutment of the driver onto the steering wheel 41 before adjusting the transfer ratio α.

The CPU 101 according to the above embodiments is configured to execute the manual steering program P0, automatic steering control program P1, and transfer ratio setting program P2 to thereby implement the transfer ratio setter M1, the target deviation angle calculator M2, and the target turning angle calculator M3, but the present disclosure is not limited thereto. Specifically, programmed hardware ICs or programmed hardware discrete circuits can be configured to implement the transfer ratio setter M1, the target deviation angle calculator M2, and the target turning angle calculator M3.

While the illustrative embodiments of the present disclosure have been described herein, the present disclosure is not limited to the embodiments and their modifications described herein, but includes any and all embodiments having modifications, omissions, combinations (e.g., of aspects across various embodiments), adaptations and/or alterations as would be appreciated by those in the art based on the present disclosure within the scope of the present disclosure.

For example, each of the technical features described in the embodiments and their modifications can be replaced with a known structure having the same function as the corresponding technical feature. Each of the technical features described in the embodiments and their modifications can also be combined with at least one of the other technical features. At least one of the technical features described in the embodiments and their modifications can further be eliminated unless the at least one of the technical features is described as an essential element in the present specification.

The present disclosure includes the following first to eighth application example. The first application example corresponds to the apparatus according to the first exemplary aspect.

A second application example is an apparatus according to the first application example in which the body posture parameter detector is configured to detect a physical position relationship between a part of the driver and the steering input device, and the transfer ratio adjuster is configured to adjust the transfer ratio in accordance with the detected physical position relationship.

A third application example is an apparatus according to the second application example in which the transfer ratio adjuster is configured to perform at least one of a first determination and a second determination. The first determination determines whether the part of the driver is being abutted onto the steering input device, and the second determination determines whether the part of the driver is likely to be being abutted onto the steering input device. The transfer ratio adjuster is configured to adjust the transfer ratio to an infinite value upon determining that the part of the driver is being abutted onto the steering input device by the first determination or determining that the part of the driver is likely to be being abutted onto the steering input device by the second determination.

A fourth application example is an apparatus according to the second application example in which the body posture parameter detector is configured to detect, as the physical position relationship between the part of the driver and the steering input device, a minimum distance between the part of the driver and the steering input device. The transfer ratio adjuster is configured to determine whether the minimum distance is smaller than a predetermined threshold, and increase the transfer ratio upon determining that the minimum distance is smaller than the predetermined threshold.

A fifth application example is an apparatus according to the second application example in which the body posture parameter detector is configured to detect, as the physical position relationship between the part of the driver and the steering input device, a minimum distance between the part of the driver and the steering input device. The transfer ratio adjuster is configured to determine whether the minimum distance is smaller than a predetermined threshold. The apparatus further includes an informing device configured to provide information indicative of a possibility of abutment of the driver onto the steering input device upon it being determined that the minimum distance is smaller than the predetermined threshold.

A sixth application example is an apparatus according to the first application example in which the body posture parameter detector comprises an imaging device that captures an image of the driver.

A seventh application example is an apparatus according to the first application example; the apparatus further includes an angle adjuster configured to generate a deviation angle between the steering angle of the steering input device and the turning angle of the turning mechanism, so that one of the steering angle and the turning angle is determined based on the deviation angle and the other of the steering angle and the turning angle. The controller is configured to control the angle adjuster such that the angle adjuster generates the deviation angle based on the adjusted transfer ratio.

An eighth application example is an apparatus according to the first application example; the apparatus further includes a steering driver configured to rotatably drive the steering input device. The steering input device and the turning mechanism are mechanically unconnected with each other. The controller is configured to control the steering input device such that the steering device rotatably drives the steering input device by a value of the steering angle, the value of the steering angle being based on the transfer ratio and a value of the turning angle.

A ninth application example is an apparatus according to the first application example in which a default value is previously set for the transfer ratio, and the transfer ratio adjuster is configured to (1) Detect, as the physical position relationship between the part of the driver and the steering input device, a minimum distance between the part of the driver and the steering input device (2) Determine whether the minimum distance is smaller than a predetermined first threshold (3) Adjust the transfer ratio to an infinite value upon determining that the minimum distance is smaller than the predetermined first threshold (4) Determiner whether the minimum distance is smaller than a predetermined second threshold upon determining that the minimum distance is equal to or larger than the predetermined first threshold, the predetermined second threshold being set to be larger than the predetermined first threshold (5) Adjust the transfer ratio to a first value smaller than the infinite value and larger than the default value upon determining that the minimum distance is smaller than the predetermined second threshold (6) Adjust the transfer ratio to the default value upon determining that the minimum distance is equal to or larger than the predetermined second threshold

What is claimed is:

1. An apparatus for controlling steering of a vehicle, the apparatus comprising:
    a turning drive unit configured to rotationally drive a turning mechanism;
    a body posture parameter detector configured to detect a body posture parameter indicative of a body posture of a driver of the vehicle; and
    a processor configured to execute an automatic steering mode by:
        determining a target value for a turning angle of the turning mechanism in accordance with at least one of a travelling condition of the vehicle and information about a road on which the vehicle is travelling;
        controlling the turning drive unit to adjust the turning angle of the turning mechanism to the target value; and
        adjusting a transfer ratio in accordance with the body posture parameter during execution of the automatic steering mode, the transfer ratio being defined as a ratio of an amount of change of the turning angle of the turning mechanism to an amount of change of a steering angle of a steering input device.

2. The apparatus according to claim 1, wherein:
    the body posture parameter detector is configured to detect a physical position relationship between a part of the driver and the steering input device as the body posture parameter; and
    the processor is configured to adjust the transfer ratio in accordance with the detected physical position relationship.

3. The apparatus according to claim 2, wherein:
    the processor is configured to:
        perform at least one of a first determination and a second determination,
            the first determination determining whether the part of the driver is contacting the steering input device,
            the second determination determining whether the part of the driver is likely to contact the steering input device; and
        adjust the transfer ratio to an infinite value upon determining that the part of the driver is contacting the steering input device by the first determination or determining that the part of the driver is likely to contact the steering input device by the second determination.

4. The apparatus according to claim 2, wherein:
    the processor is configured to:
    determine whether a minimum distance between the part of the driver and the steering input device is smaller than a predetermined threshold, the minimum distance being determined using the physical position relationship; and
    increase the transfer ratio upon determining that the minimum distance is smaller than the predetermined threshold.

5. The apparatus according to claim 2, wherein:
    the processor is configured to:
        determine whether a minimum distance between the part of the driver and the steering input device is smaller than a predetermined threshold, the minimum distance being determined using the physical position relationship,
    the apparatus further comprising:
        an informing device configured to provide information indicative of a possibility of abutment of the driver onto the steering input device upon it being determined that the minimum distance is smaller than the predetermined threshold.

6. The apparatus according to claim 1, wherein:
    the body posture parameter detector comprises an imaging device that captures an image of the driver.

7. The apparatus according to claim 1, further comprising:
    an angle adjuster configured to generate a deviation angle between the steering angle of the steering input device and the turning angle of the turning mechanism, so that one of the steering angle and the turning angle is determined based on the deviation angle and the other of the steering angle and the turning angle,
    wherein the processor is configured to control the angle adjuster such that the angle adjuster generates the deviation angle based on the adjusted transfer ratio.

8. The apparatus according to claim 1, further comprising:
    a steering drive unit configured to rotatably drive the steering input device,
    wherein:
        the steering input device and the turning mechanism are mechanically unconnected with each other, and
        the processor is configured to control the steering input device such that the steering drive unit rotatably drives the steering input device by a value of the steering angle, the value of the steering angle being based on the transfer ratio and a value of the turning angle.

9. An apparatus for controlling a steering of a vehicle, the vehicle including a turning mechanism, a turning drive unit configured to rotationally drive the turning mechanism, a body posture parameter detector configured to detect a body posture parameter indicative of a body posture of a driver, and a steering input device, the apparatus comprising:
    a memory; and
    a processor communicably connected to the memory and configured to execute an automatic steering mode by:
        determining a target value for a turning angle of the turning mechanism in accordance with at least one of a travelling condition of the vehicle and information about a road on which the vehicle is travelling;

controlling the turning drive unit to adjust the turning angle of the turning mechanism to the target value; and adjusting a transfer ratio in accordance with the body posture parameter during execution of the automatic steering mode, the transfer ratio being defined as a ratio of an amount of change of the turning angle of the turning mechanism to an amount of change of a steering angle of a steering input device.

10. The apparatus according to claim 9, wherein:

a physical position relationship between a part of the driver and the steering input device is detected as the body posture parameter by the body posture parameter detector; and the processor is configured to adjust the transfer ratio in accordance with the detected physical position relationship.

11. The apparatus according to claim 10, wherein:

the processor is configured to:

perform at least one of a first determination and a second determination, the first determination determining whether the part of the driver is being abutted onto the steering input device, the second determination determining whether the part of the driver is likely to be being abutted onto the steering input device; and adjust the transfer ratio to an infinite value upon determining that the part of the driver is being abutted onto the steering input device by the first determination or determining that the part of the driver is likely to be being abutted onto the steering input device by the second determination.

12. The apparatus according to claim 10, wherein:

the processor is configured to:

determine whether a minimum distance is smaller than a predetermined threshold, the minimum distance being determined using the physical position relationship; and increase the transfer ratio upon determining that the minimum distance is smaller than the predetermined threshold.

13. A method of controlling a steering of a vehicle, the vehicle including a turning mechanism, a turning drive unit configured to rotationally drive the turning mechanism, a body posture parameter detector configured to detect a body posture parameter indicative of a body posture of a driver, the method comprising:

executing an automatic steering mode to:

determine a target value for a turning angle of the turning mechanism in accordance with at least one of a travelling condition of the vehicle and information about a road on which the vehicle is travelling; and control the turning drive unit to adjust the turning angle of the turning mechanism to the target value; and adjusting a transfer ratio in accordance with the body posture parameter during execution of the automatic steering mode, the transfer ratio being defined as a ratio of an amount of change of the turning angle of the turning mechanism to an amount of change of a steering angle of a steering input device.

14. An apparatus for controlling steering of a vehicle, the apparatus comprising:

a turning drive unit, using a motor, configured to rotationally drive a turning mechanism;

a body posture parameter detector, using an imaging device, configured to detect a body posture parameter indicative of a body posture of a driver of the vehicle; and a processor configured to:

execute an automatic steering mode to by determining a target value for a turning angle of the turning mechanism in accordance with at least one of a travelling condition of the vehicle and information about a road on which the vehicle is travelling and controlling the turning drive unit to adjust the turning angle of the turning mechanism to the target value; and adjust a transfer ratio in accordance with the body posture parameter during execution of the automatic steering mode, the transfer ratio being defined as a ratio of an amount of change of the turning angle of the turning mechanism to an amount of change of a steering angle of a steering input device.

* * * * *